United States Patent
Huang

(10) Patent No.: US 12,078,786 B2
(45) Date of Patent: *Sep. 3, 2024

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,983

(22) Filed: Jul. 19, 2023

(65) Prior Publication Data

US 2023/0384563 A1    Nov. 30, 2023

Related U.S. Application Data

(63) Continuation of application No. 17/564,009, filed on Dec. 28, 2021, now Pat. No. 11,754,816, which is a (Continued)

(30) Foreign Application Priority Data

Apr. 15, 2015 (TW) ................... 104112136

(51) Int. Cl.
*G02B 13/00* (2006.01)
*G02B 9/62* (2006.01)
*G02B 27/00* (2006.01)

(52) U.S. Cl.
CPC ............ *G02B 13/0045* (2013.01); *G02B 9/62* (2013.01); *G02B 27/0025* (2013.01)

(58) Field of Classification Search
CPC ... G02B 13/0045; G02B 9/62; G02B 27/0025
See application file for complete search history.

(56) References Cited

U.S. PATENT DOCUMENTS

| 2,494,025 A | 1/1950 | Altman |
| 2,621,564 A | 12/1952 | Bertele |

(Continued)

FOREIGN PATENT DOCUMENTS

| CN | 201611405 U | 10/2010 |
| CN | 103576297 A | 2/2014 |

(Continued)

*Primary Examiner* — George G. King
(74) *Attorney, Agent, or Firm* — Maschoff Brennan

(57) ABSTRACT

A photographing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. The third lens element has positive refractive power, wherein both surfaces thereof are aspheric. The fourth lens element has refractive power, wherein both surfaces thereof are aspheric. The fifth lens element has negative refractive power, wherein both surfaces thereof are aspheric. The sixth lens element with positive refractive power has an object-side surface being concave in a paraxial region thereof and an image-side surface being convex in a paraxial region thereof, wherein both of the two surfaces are aspheric.

21 Claims, 20 Drawing Sheets

Related U.S. Application Data continuation of application No. 16/698,793, filed on Nov. 27, 2019, now Pat. No. 11,243,382, which is a continuation of application No. 15/893,516, filed on Feb. 9, 2018, now Pat. No. 10,539,762, which is a continuation of application No. 15/204,726, filed on Jul. 7, 2016, now Pat. No. 9,927,598, which is a continuation of application No. 14/812,570, filed on Jul. 29, 2015, now Pat. No. 9,417,434.

(56) References Cited

U.S. PATENT DOCUMENTS

| | | |
|---|---|---|
| 2,792,749 A | 5/1957 | Koch |
| 4,189,214 A | 2/1980 | Matsui et al. |
| 4,389,099 A | 6/1983 | Imai |
| 4,390,250 A | 6/1983 | Imai |
| 4,493,050 A | 1/1985 | Hashimoto et al. |
| 4,634,235 A | 1/1987 | Fujioka |
| 4,659,186 A | 4/1987 | Sato et al. |
| 4,693,568 A | 9/1987 | Takahashi |
| 4,787,721 A | 11/1988 | Fukushima et al. |
| 4,854,683 A | 8/1989 | Ozawa |
| 5,299,065 A | 3/1994 | Watanabe |
| 5,526,191 A | 6/1996 | Nishii et al. |
| 5,633,736 A | 5/1997 | Griffith et al. |
| 5,684,635 A | 11/1997 | Sugawara |
| 5,757,553 A | 5/1998 | Sugawara |
| 5,828,498 A | 10/1998 | Sekiya et al. |
| 5,936,775 A | 8/1999 | Abe |
| 5,991,088 A | 11/1999 | Mizouchi |
| 6,867,933 B2 | 3/2005 | Vatsusaka |
| 7,787,196 B2 | 8/2010 | Asami et al. |
| 8,385,006 B2 | 2/2013 | Tsai et al. |
| 8,599,495 B1 | 12/2013 | Tsai et al. |
| 8,854,745 B1 | 10/2014 | Chen |
| 8,885,268 B2 | 11/2014 | Tang et al. |
| 8,934,178 B2 | 1/2015 | Tang et al. |
| 9,019,626 B2 | 4/2015 | Hsieh et al. |
| 9,036,272 B2 | 5/2015 | Huang |
| 9,063,319 B1 | 6/2015 | Tang et al. |
| 9,075,222 B2 | 7/2015 | Kawamura |
| 9,128,264 B2 | 9/2015 | Huang |
| 9,235,027 B2 | 1/2016 | Chen et al. |
| 9,239,447 B1 | 1/2016 | Chen |
| 9,316,811 B2 | 4/2016 | Chen |
| 9,372,325 B2 | 6/2016 | Cho et al. |
| 9,442,274 B2 | 9/2016 | Huang |
| 9,557,531 B2 | 1/2017 | Nishihata et al. |
| 9,798,116 B2 | 10/2017 | Hashimoto |
| 9,804,358 B2 | 10/2017 | Nabeta |
| 10,209,493 B2 | 2/2019 | Kubota et al. |
| 10,228,536 B2 | 3/2019 | Shigemitsu |
| 10,330,893 B2 | 6/2019 | Kubota et al. |
| 2010/0188555 A1 | 7/2010 | Hirao et al. |
| 2010/0188556 A1 | 7/2010 | Hirao et al. |
| 2012/0243108 A1 | 9/2012 | Tsai et al. |
| 2013/0010181 A1 | 1/2013 | Baba |
| 2013/0050846 A1* | 2/2013 | Huang ............... G02B 13/0045 359/713 |
| 2014/0098239 A1 | 4/2014 | Jeong |
| 2014/0111876 A1 | 4/2014 | Tang et al. |
| 2014/0126070 A1 | 5/2014 | Ning |
| 2014/0307338 A1 | 10/2014 | Kawamura |
| 2015/0042862 A1 | 2/2015 | Huang |
| 2015/0062721 A1 | 3/2015 | Kim et al. |
| 2015/0138431 A1 | 5/2015 | Shin et al. |
| 2015/0153546 A1* | 6/2015 | Tang ...................... G02B 13/18 359/713 |
| 2015/0160435 A1 | 6/2015 | Chen et al. |
| 2015/0160436 A1 | 6/2015 | Chen et al. |
| 2015/0168686 A1 | 6/2015 | Nishihata et al. |
| 2015/0177483 A1 | 6/2015 | You |
| 2015/0192760 A1 | 7/2015 | Huang |
| 2015/0198791 A1* | 7/2015 | Kubota ............... G02B 27/0025 359/689 |
| 2015/0268452 A1 | 9/2015 | Kawamura |
| 2015/0301311 A1 | 10/2015 | Chen et al. |
| 2015/0301312 A1 | 10/2015 | Chen et al. |
| 2015/0301315 A1 | 10/2015 | Chen et al. |
| 2015/0309289 A1 | 10/2015 | Nakamura |
| 2015/0323765 A1 | 11/2015 | Hashimoto |
| 2015/0338612 A1 | 11/2015 | Yu |
| 2015/0370042 A1 | 12/2015 | Chen et al. |
| 2016/0033742 A1 | 2/2016 | Huang |
| 2016/0054543 A1 | 2/2016 | Nabeta |
| 2016/0062081 A1 | 3/2016 | Kubota et al. |
| 2016/0085052 A1 | 3/2016 | Park |
| 2016/0109688 A1 | 4/2016 | Jo |
| 2016/0124185 A1 | 5/2016 | Tang et al. |
| 2016/0124189 A1 | 5/2016 | Park |
| 2016/0124192 A1 | 5/2016 | Koreeda |
| 2016/0124193 A1 | 5/2016 | Kim et al. |
| 2016/0170182 A1 | 6/2016 | Tanaka |
| 2016/0187622 A1 | 6/2016 | Huang |
| 2016/0216480 A1 | 7/2016 | Chen et al. |
| 2016/0216481 A1 | 7/2016 | Chen et al. |
| 2016/0216484 A1 | 7/2016 | Chen et al. |
| 2016/0259150 A1 | 9/2016 | Shin et al. |
| 2016/0356989 A1 | 12/2016 | Kubota et al. |
| 2017/0023775 A1 | 1/2017 | Shigemitsu |

FOREIGN PATENT DOCUMENTS

| | | |
|---|---|---|
| CN | 103597395 A | 2/2014 |
| CN | 203606558 U | 5/2014 |
| CN | 204241750 U | 4/2015 |
| CN | 104730687 A | 6/2015 |
| CN | 204536635 U | 8/2015 |
| CN | 204613496 U | 9/2015 |
| CN | 105467562 A | 4/2016 |
| CN | 205333956 U | 6/2016 |
| JP | S56-123510 A | 9/1981 |
| JP | S57-22215 A | 2/1982 |
| JP | S59-29214 A | 2/1984 |
| JP | S59-83121 A | 5/1984 |
| JP | S61-138225 A | 6/1986 |
| JP | S62-254112 A | 11/1987 |
| JP | H02-173712 A | 7/1990 |
| JP | H02-272512 A | 11/1990 |
| JP | H03-121406 A | 5/1991 |
| JP | H03-150517 A | 6/1991 |
| JP | H05-264899 A | 10/1993 |
| JP | H07-43622 A | 2/1995 |
| JP | H11-72720 A | 3/1999 |
| JP | 2015-114569 A | 6/2015 |
| JP | 2015-215398 A | 12/2015 |
| JP | 2016-090777 A | 5/2016 |
| JP | 2016-114803 A | 6/2016 |
| WO | 2012/169778 A2 | 12/2012 |
| WO | 2013/099211 A1 | 7/2013 |
| WO | 2014/162779 A1 | 10/2014 |
| WO | 2014/175038 A1 | 10/2014 |
| WO | 2015/151697 A1 | 10/2015 |

* cited by examiner

PHOTOGRAPHING LENS ASSEMBLY, IMAGE CAPTURING UNIT AND ELECTRONIC DEVICE

RELATED APPLICATIONS

This application is a continuation patent application of U.S. application Ser. No. 17/564,009, filed on Dec. 28, 2021, which is a continuation patent application of U.S. application Ser. No. 16/698,793, filed on Nov. 27, 2019, which is a continuation patent application of U.S. application Ser. No. 15/893,516, filed on Feb. 9, 2018, which is a continuation patent application of U.S. application Ser. No. 15/204,726, filed on Jul. 7, 2016, which is a continuation patent application of U.S. application Ser. No. 14/812,570, filed on Jul. 29, 2015, which claims priority to Taiwan Application 104112136, filed on Apr. 15, 2015, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, wearable devices and tablet personal computers, the requirements for high resolution and image quality of present compact optical systems increase significantly. However, the conventional optical systems cannot satisfy these requirements of the compact optical systems.

Other conventional compact optical systems with six-element lens structure are developed. However, a total track length of the conventional optical system is overly large. Furthermore, the conventional optical system also has the shortcomings of excessive chromatic aberration, unevenly distributed refractive power, severe aberration at the peripheral region of the image and insufficient relative illumination.

SUMMARY

According to one aspect of the present disclosure, a photographing lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has negative refractive power. The third lens element has positive refractive power, wherein both of an object-side surface and an image-side surface of the third lens element are aspheric. The fourth lens element has refractive power, wherein both of an object-side surface and an image-side surface of the fourth lens element are aspheric. The fifth lens element has negative refractive power, wherein both of an object-side surface and an image-side surface of the fifth lens element are aspheric. The sixth lens element with positive refractive power has an object-side surface being concave in a paraxial region thereof and an image-side surface being convex in a paraxial region thereof, wherein both of the object-side surface and the image-side surface of the sixth lens element are aspheric. The photographing lens assembly has a total of six lens elements with refractive power. There is an air gap in a paraxial region between every two of the first lens element, the second lens element, the third lens element, the fourth lens element, the fifth lens element and the sixth lens element that are adjacent to each other. The photographing lens assembly further includes a stop. When an axial distance between the second lens element and the third lens element is T23, an axial distance between the third lens element and the fourth lens element is T34, an axial distance between the stop and the image-side surface of the sixth lens element is SD, an axial distance between the object-side surface of the first lens element and the image-side surface of the sixth lens element is TD, the following conditions are satisfied:

$0 < T23/T34 < 1.5$; and $0.75 < SD/TD < 1.2$.

According to another aspect of the present disclosure, an image capturing unit includes the aforementioned photographing lens assembly and an image sensor, wherein the image sensor is disposed on the image side of the photographing lens assembly.

According to still another aspect of the present disclosure, an electronic device includes the aforementioned image capturing unit.

According to yet another aspect of the present disclosure, a photographing lens assembly includes, in order from an object side to an image side, a first lens element, a second lens element, a third lens element, a fourth lens element, a fifth lens element, and a sixth lens element. The first lens element has positive refractive power. The second lens element with negative refractive power has an object-side surface being convex in a paraxial region thereof and an image-side surface being concave in a paraxial region thereof. The third lens element has positive refractive power, wherein both of an object-side surface and an image-side surface of the third lens element are aspheric. The fourth lens element has refractive power, wherein both of an object-side surface and an image-side surface of the fourth lens element are aspheric. The fifth lens element has refractive power, wherein both of an object-side surface and an image-side surface of the fifth lens element are aspheric. The sixth lens element with positive refractive power has an object-side surface being concave in a paraxial region thereof and an image-side surface being convex in a paraxial region thereof, wherein both of the object-side surface and the image-side surface of the sixth lens element are aspheric. The photographing lens assembly has a total of six lens elements with refractive power. There is an air gap in a paraxial region between every two of the first lens element, the second lens element, the third lens element, the fourth lens element, the fifth lens element and the sixth lens element that are adjacent to each other. The photographing lens assembly further includes a stop. When an axial distance between the second lens element and the third lens element is T23, an axial distance between the third lens element and the fourth lens element is T34, an axial distance between the stop and the image-side surface of the sixth lens element is SD, an axial distance between an object-side surface of the first lens element and the image-side surface of the sixth lens element is TD, the following conditions are satisfied:

0<*T*23/*T*34<2.5; and 0.75<*SD/TD*<1.2.

According to yet another aspect of the present disclosure, a photographing lens assembly includes, in order from an object side to an image side, a first lens element, a second lens element, a third lens element, a fourth lens element, a fifth lens element, and a sixth lens element. The first lens element has positive refractive power. The second lens element with negative refractive power has an object-side surface being convex in a paraxial region thereof and an image-side surface being concave in a paraxial region thereof. The third lens element with refractive power has an object-side surface being convex in a paraxial region thereof, wherein both of the object-side surface and an image-side surface of the third lens element are aspheric. The fourth lens element has refractive power, wherein both of an object-side surface and an image-side surface of the fourth lens element are aspheric. The fifth lens element has refractive power, wherein both of an object-side surface and an image-side surface of the fifth lens element are aspheric. The sixth lens element with positive refractive power has an object-side surface being concave in a paraxial region thereof and an image-side surface being convex in a paraxial region thereof, wherein both of the object-side surface and the image-side surface of the sixth lens element are aspheric. The photographing lens assembly has a total of six lens elements with refractive power. There is an air gap in a paraxial region between every two of the first lens element, the second lens element, the third lens element, the fourth lens element, the fifth lens element and the sixth lens element that are adjacent to each other. The photographing lens assembly further includes a stop. When an axial distance between the second lens element and the third lens element is T23, an axial distance between the third lens element and the fourth lens element is T34, an axial distance between the stop and the image-side surface of the sixth lens element is SD, an axial distance between an object-side surface of the first lens element and the image-side surface of the sixth lens element is TD, the following conditions are satisfied:

0<*T*23/*T*34<5.0; and 0.75<*SD/TD*<1.2.

According to yet another aspect of the present disclosure, a photographing lens assembly includes, in order from an object side to an image side, a first lens element, a second lens element, a third lens element, a fourth lens element, a fifth lens element, and a sixth lens element. The first lens element has positive refractive power. The second lens element has negative refractive power. The third lens element has refractive power, wherein both of an object-side surface and an image-side surface of the third lens element are aspheric. The fourth lens element has refractive power, wherein both of an object-side surface and an image-side surface of the fourth lens element are aspheric. The fifth lens element with refractive power has an image-side surface being concave in a paraxial region thereof, wherein both of an object-side surface and the image-side surface of the fifth lens element are aspheric. The sixth lens element with positive refractive power has an object-side surface being concave in a paraxial region thereof and an image-side surface being convex in a paraxial region thereof, wherein both of the object-side surface and the image-side surface of the sixth lens element are aspheric. The photographing lens assembly has a total of six lens elements with refractive power. There is an air gap in a paraxial region between every two of the first lens element, the second lens element, the third lens element, the fourth lens element, the fifth lens element and the sixth lens element that are adjacent to each other. The photographing lens assembly further includes a stop. When an axial distance between the second lens element and the third lens element is T23, an axial distance between the third lens element and the fourth lens element is T34, an axial distance between the stop and the image-side surface of the sixth lens element is SD, an axial distance between an object-side surface of the first lens element and the image-side surface of the sixth lens element is TD, the following conditions are satisfied:

0<*T*23/*T*34<2.5; and 0.75<*SD/TD*<1.2.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
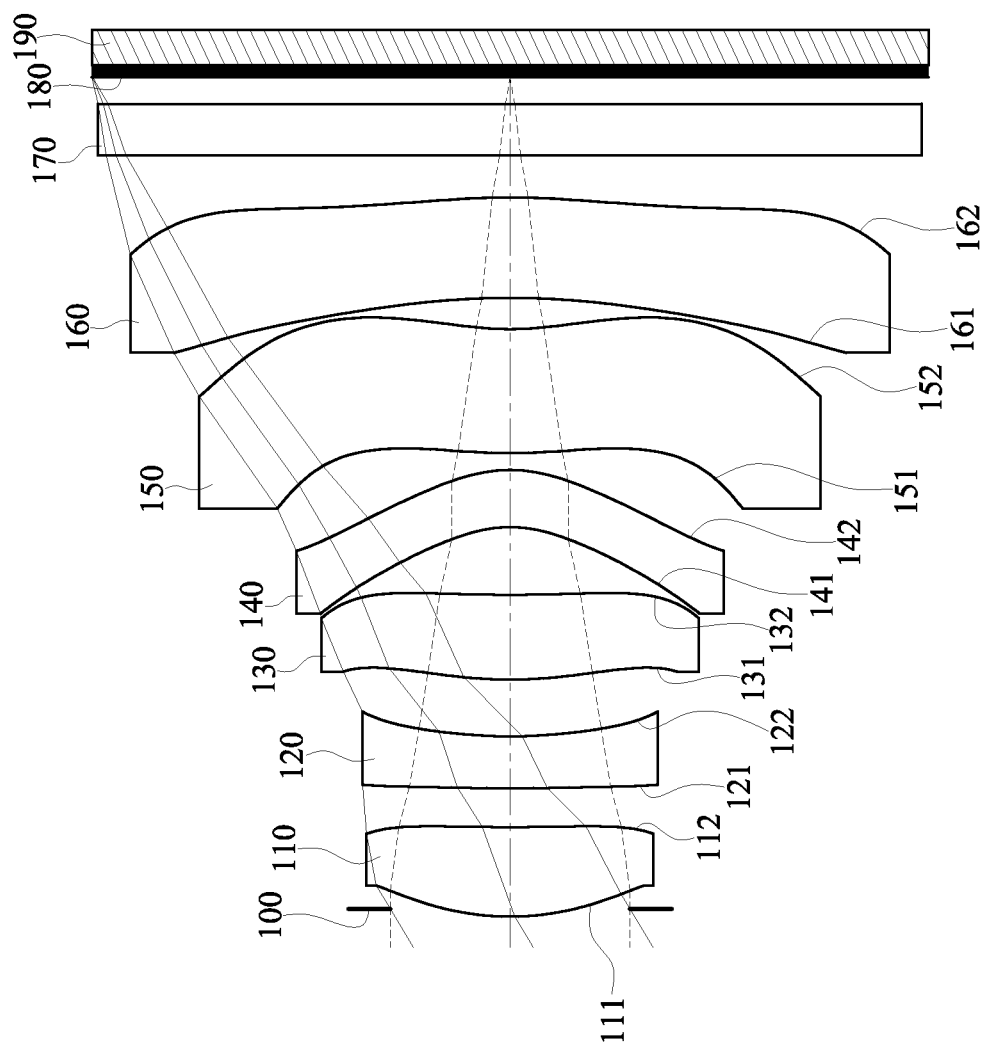
FIG. 1 is a schematic view of an image capturing unit according to the 1st embodiment of the present disclosure.

A photographing lens assembly includes, in order from an object side to an image side, a first lens element, a second lens element, a third lens element, a fourth lens element, a fifth lens element and a sixth lens element. The photographing lens assembly has a total of six lens elements with refractive power.

According to the photographing lens assembly of the present disclosure, there is an air gap in a paraxial region arranged between every two of the first lens element, the second lens element, the third lens element, the fourth lens element, the fifth lens element and the sixth lens element that are adjacent to each other, that is, each of the first through sixth lens elements of the photographing lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there is an air gap in a paraxial region between every two of the first lens element, the second lens element, the third lens element, the fourth lens element, the fifth lens element and the sixth lens element that are adjacent to each other in the present disclosure for solving the problem generated by the cemented lens elements.

The first lens element with positive refractive power can have an object-side surface being convex in a paraxial region thereof. Therefore, it is favorable for keeping the photographing lens assembly compact.

The second lens element with negative refractive power can have an object-side surface being convex in a paraxial region thereof and an image-side surface being concave in a paraxial region thereof. Therefore, it is favorable for correcting the chromatic aberration.

The third lens element can have positive refractive power. The third lens element can have an object-side surface being convex in a paraxial region thereof. Therefore, it is favorable for balancing the arrangement of the refractive power so as to reduce the sensitivity of the photographing lens assembly.

The fourth lens element can have negative refractive power. The fourth lens element can have an object-side surface being concave in a paraxial region thereof and an image-side surface being convex in a paraxial region thereof. Therefore, it is favorable for effectively correcting the Petzval's sum so as to improve the flatness of an image surface and effectively correct the astigmatism.

The fifth lens element can have negative refractive power. The fifth lens element can have an object-side surface being convex in a paraxial region thereof and an image-side surface being concave in a paraxial region thereof. At least one of the object-side surface and the image-side surface of the fifth lens element can have at least one inflection point. Therefore, it is favorable for the principal point being positioned away from the image side of the photographing lens assembly so as to reduce the back focal length, thereby keeping a compact size thereof. Furthermore, it is favorable for effectively reducing the incident angle of the light projecting onto the image sensor so as to improve the image-sensing efficiency of the image sensor, thereby effectively correcting the aberration of the off-axis field.

The sixth lens element with positive refractive power has an object-side surface being concave in a paraxial region thereof and an image-side surface being convex in a paraxial region thereof. At least one of the object-side surface and the image-side surface of the sixth lens element can have at least one inflection point. Therefore, it is favorable for balancing the refractive power distribution of the photographing lens assembly and correcting the aberration at the peripheral region of the image, thereby improving the image quality.

When an axial distance between the second lens element and the third lens element is T23, an axial distance between the third lens element and the fourth lens element is T34, the following condition is satisfied: $0<T23/T34<5.0$. Therefore, the axial distances between the third lens element and the adjacent lens elements are properly distributed so that it is favorable for improving the image quality and providing the photographing lens assembly with sufficient amount of space; thereby, it is favorable for assembling the photographing lens assembly so as to increase the manufacturing yield rate. Preferably, the following condition is satisfied: $0<T23/T34<2.5$. Preferably, the following condition can also be satisfied: $0<T23/T34<1.5$. Preferably, the following condition can be further satisfied: $0.1<T23/T34<1.0$.

According to the present disclosure, the photographing lens assembly further includes a stop. When an axial distance between the stop and the image-side surface of the sixth lens element is SD, an axial distance between the object-side surface of the first lens element and the image-side surface of the sixth lens element is TD, the following condition is satisfied: $0.75<SD/TD<1.2$. Therefore, it is favorable for reducing a total track length of the photographing lens assembly and providing sufficient relative illumination so as to keep the photographing lens assembly compact and improve the image quality.

When a focal length of the photographing lens assembly is f, a curvature radius of the image-side surface of the fifth lens element is R10, a curvature radius of the object-side surface of the sixth lens element is R11, the following condition can be satisfied: $0.25<|R10-R11|/f$. Therefore, it is favorable for increasing the difference of the curvatures between the fifth lens element and the sixth lens element so as to improve the capability of aberration correction.

When a curvature radius of the object-side surface of the fourth lens element is R7, a curvature radius of the image-side surface of the fourth lens element is R8, the following condition can be satisfied: $-0.5<(R7-R8)/(R7+R8)<0.5$. Therefore, the curvature of the fourth lens element is properly distributed so that it is favorable for solving numerous molding problems.

When the curvature radius of the object-side surface of the sixth lens element is R11, a curvature radius of the image-side surface of the sixth lens element is R12, the following condition can be satisfied: $-1.0 < R12/|R11| < 0$. Therefore, it is favorable for correcting the aberration of the photographing lens assembly.

When a maximum refractive index among the first lens element, the second lens element, the third lens element, the fourth lens element, the fifth lens element and the sixth lens element is Nmax, the following condition can be satisfied: $1.50 < Nmax < 1.70$. Therefore, the refractive indices of the lens elements are properly distributed so that it is favorable for choosing proper material for each lens element.

When an axial distance between the object-side surface of the first lens element and the image surface is TL, the following condition can be satisfied: TL<8.0 millimeters (mm). Therefore, it is favorable for keeping the photographing lens assembly compact so as to be equipped in an electronic device.

When a focal length of the first lens element is f1, a focal length of the i-th lens element is fi (for example, a focal length of the second lens element is f2, a focal length of the third lens element is f3, a focal length of the fourth lens element is f4, a focal length of the fifth lens element is f5, and a focal length of the sixth lens element is f6), the following condition can be satisfied: $|f1| < |fi|$, wherein i=2, 3, 4, 5, 6. Therefore, it is favorable for concentrating the positive refractive power at the object side of the photographing lens assembly so as to keep the photographing lens assembly compact.

According to the present disclosure, at least one of the first lens element, the second lens element, the third lens element, the fourth lens element, the fifth lens element and the sixth lens element can have at least one inflection point. That is, each of the object-side surfaces and the image-side surfaces of the first lens element, the second lens element, the third lens element, the fourth lens element, the fifth lens element and the sixth lens element can have at least one inflection point. Therefore, it is favorable for correcting the aberration of the off-axis field so as to improve the image quality.

According to the present disclosure, there is no lens element with refractive power between the stop and the first lens element. That is, the stop can be disposed between an imaged object and the first lens element, or can be disposed between the first lens element and the second lens element. Therefore, it is favorable for obtaining a balance between the telecentric and wide-angle characteristics.

When a central thickness of the third lens element is CT3, the axial distance between the third lens element and the fourth lens element is T34, the following condition can be satisfied: $0.5 < CT3/T34 < 1.9$. Therefore, it is favorable for effectively balancing the refractive power distribution of the photographing lens assembly.

When the focal length of the photographing lens assembly is f, the focal length of the fifth lens element is f5, the following condition can be satisfied: $-1.0 < f/f5 < 0$. Therefore, it is favorable for reducing the back focal length so as to stay in a compact size thereof and reduce the sensitivity of the photographing lens assembly.

When the curvature radius of the object-side surface of the sixth lens element is R11, the curvature radius of the image-side surface of the sixth lens element is R12, the following condition can be satisfied: $0 < (R11-R12)/(R11+R12) < 1.0$. Therefore, it is favorable for correcting the astigmatism so as to further improve the image quality.

When a curvature radius of the object-side surface of the third lens element is R5, a curvature radius of an image-side surface of the third lens element is R6, the following condition can be satisfied: $-3.5 < (R5+R6)/(R5-R6) < 1.2$. Therefore, it is favorable for correcting the spherical aberration.

When the axial distance between the third lens element and the fourth lens element is T34, an axial distance between the fourth lens element and the fifth lens element is T45, the following condition can be satisfied: $0 < T45/T34 < 1.5$. Therefore, it is favorable for reducing the total track length so as to keep the photographing lens assembly compact.

When the focal length of the photographing lens assembly is f, the focal length of the fourth lens element is f4, the following condition can be satisfied: $-1.0 < f/f4 < 0.5$. Therefore, it is favorable for reducing the back focal length so as to stay in a compact size thereof and reduce the sensitivity of the photographing lens assembly.

When an axial distance between the image-side surface of the sixth lens element and the image surface is BL, the axial distance between the object-side surface of the first lens element and the image-side surface of the sixth lens element is TD, the following condition can be satisfied: $0.1 < BL/TD < 0.25$. Therefore, it is favorable for further reducing the back focal length so as to keep the photographing lens assembly compact. Furthermore, it is also favorable for disposing additional optical components.

According to the photographing lens assembly of the present disclosure, an aperture stop can be configured as a front stop or a middle stop. A front stop disposed between an imaged object and the first lens element can provide a longer distance between an exit pupil and the image surface to produce a telecentric effect, and thereby improves the image-sensing efficiency of an image sensor (for example, CCD or CMOS). A middle stop disposed between the first lens element and the image surface is favorable for enlarging the field of view and thereby provides a wider field of view for the same.

According to the photographing lens assembly of the present disclosure, the lens elements thereof can be made of glass or plastic material. When the lens elements are made of glass material, the distribution of the refractive power of the photographing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens assembly can also be reduced.

According to the photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the photographing lens assembly of the present disclosure, an image surface of the photographing lens assembly, based on the corresponding image sensor, can be flat or curved, especially a curved surface being concave facing towards the object side of the photographing lens assembly.

According to the photographing lens assembly of the present disclosure, the photographing lens assembly can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the photographing lens assembly according to the aforementioned photographing lens assembly of the present disclosure, and an image sensor, wherein the image sensor is disposed on the image side of the aforementioned photographing lens assembly, that is, the image sensor can be disposed on or near an image surface of the aforementioned photographing lens assembly. In some embodiments, the image capturing unit can further include a barrel member, a holding member or a combination thereof.

Figure 20:
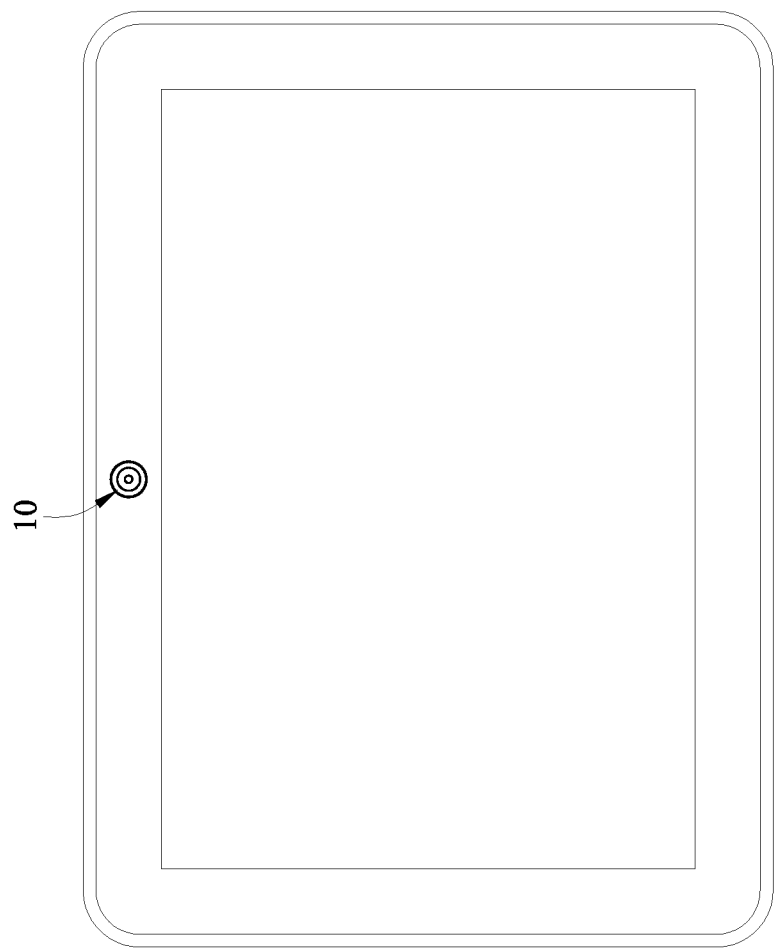
FIG. 20 shows an electronic device according to another embodiment.
Figure 19:
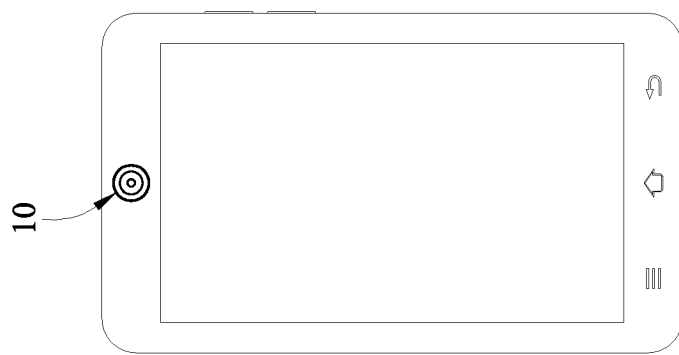
FIG. 19 shows an electronic device according to one embodiment.
Figure 21:
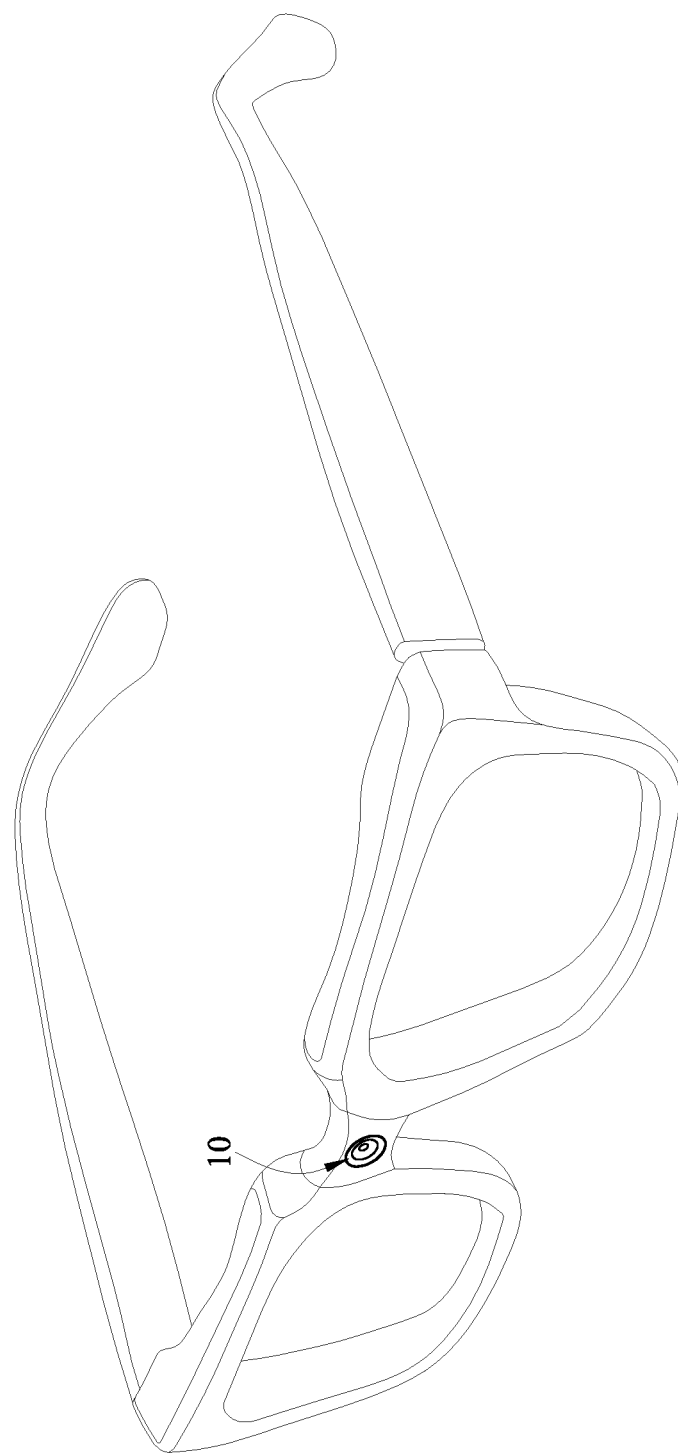
FIG. 21 shows an electronic device according to still another embodiment.

In FIG. 19, FIG. 20 and FIG. 21, an image capturing device 10 may be installed in, but not limited to, an electronic device, including a smart phone (FIG. 19), a tablet personal computer (FIG. 20) or a wearable device (FIG. 21). The electronic devices shown in the figures are only exemplary for showing the image capturing device of present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the photographing lens assembly of the present disclosure, the photographing lens assembly can be optionally applied to moving focus optical systems. Furthermore, the photographing lens assembly is featured with good capability in the corrections resulting high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
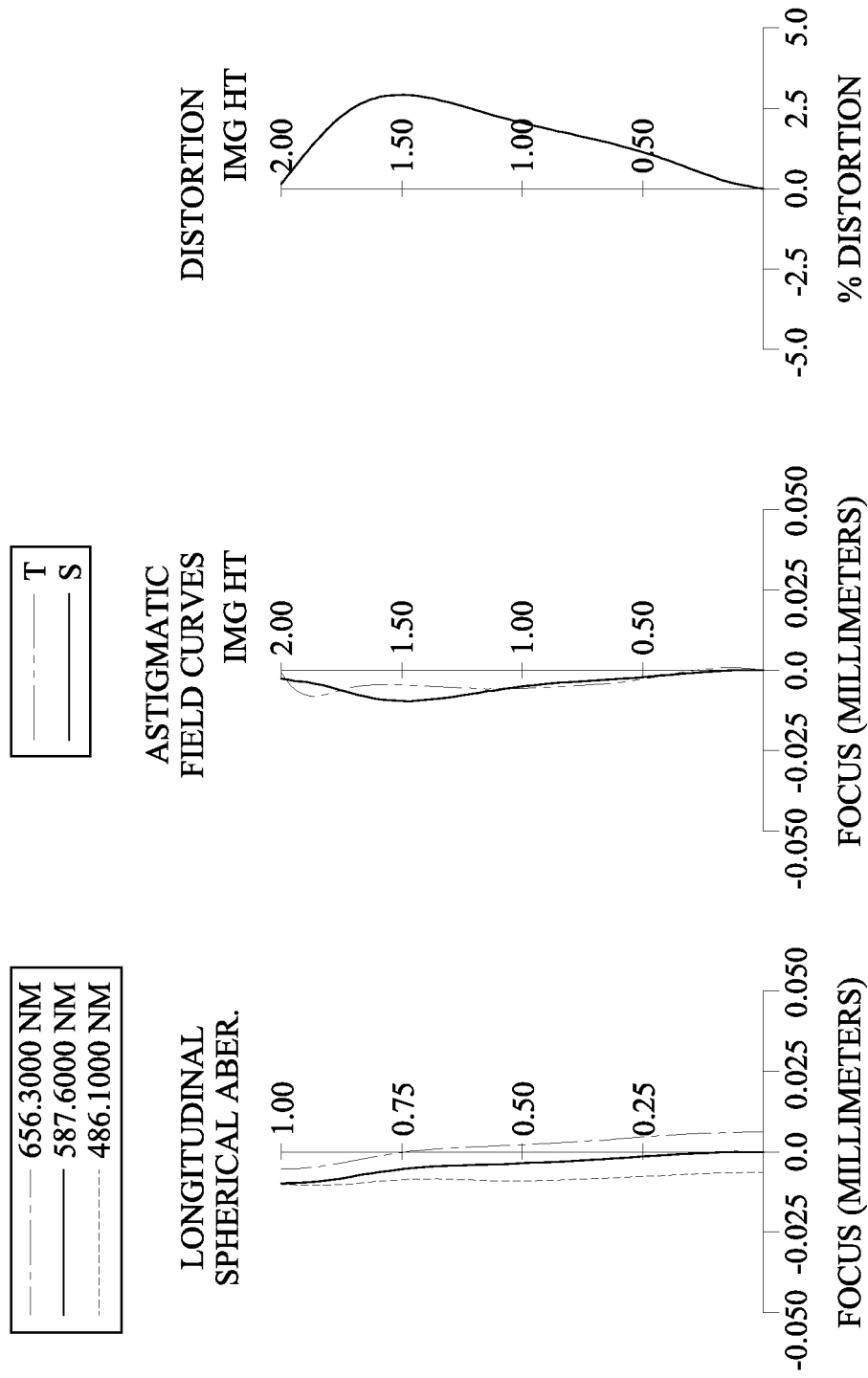
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 190. The photographing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the photographing lens assembly has a total of six lens elements (110-160) with refractive power. There is an air gap in a paraxial region between every two of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The image-side surface 162 of the sixth lens element 160 has at least one inflection point.

The IR-cut filter 170 is made of glass and located between the sixth lens element 160 and the image surface 180, and will not affect the focal length of the photographing lens assembly. The image sensor 190 is disposed on or near the image surface 180 of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14 and 16.

In the photographing lens assembly of the image capturing unit according to the 1st embodiment, when a focal length of the photographing lens assembly is f, an f-number of the photographing lens assembly is Fno, and half of a maximal field of view of the photographing lens assembly is HFOV, these parameters have the following values: f=3.33 millimeters (mm); Fno=2.90; and HFOV=31.0 degrees (deg.).

When a maximum refractive index among the first lens element 110, the second lens element 120, the third lens element 130, the fourth lens element 140, the fifth lens element 150 and the sixth lens element 160 is Nmax, the following condition is satisfied: Nmax=1.650.

When a central thickness of the third lens element 130 is CT3, an axial distance between the third lens element 130 and the fourth lens element 140 is T34, the following condition is satisfied: CT3/T34=1.26.

When an axial distance between the second lens element 120 and the third lens element 130 is T23, the axial distance between the third lens element 130 and the fourth lens element 140 is T34, the following condition is satisfied: T23/T34=0.84.

When the axial distance between the third lens element 130 and the fourth lens element 140 is T34, an axial distance between the fourth lens element 140 and the fifth lens element 150 is T45, the following condition is satisfied: T45/T34=0.25.

When a curvature radius of the object-side surface 131 of the third lens element 130 is R5, a curvature radius of the image-side surface 132 of the third lens element 130 is R6, the following condition is satisfied: (R5+R6)/(R5−R6)=−1.63.

When a curvature radius of the object-side surface 141 of the fourth lens element 140 is R7, a curvature radius of the image-side surface 142 of the fourth lens element 140 is R8, the following condition is satisfied: (R7−R8)/(R7+R8)=−0.06.

When a curvature radius of the object-side surface 161 of the sixth lens element 160 is R11, a curvature radius of the image-side surface 162 of the sixth lens element 160 is R12, the following condition is satisfied: (R11−R12)/(R11+R12)=0.10.

When the curvature radius of the object-side surface 161 of the sixth lens element 160 is R11, the curvature radius of the image-side surface 162 of the sixth lens element 160 is R12, the following condition is satisfied: R12/|R11|=−0.82.

When the focal length of the photographing lens assembly is f, a curvature radius of the image-side surface 152 of the fifth lens element 150 is R10, the curvature radius of the object-side surface 161 of the sixth lens element 160 is R11, the following condition is satisfied: |R10−R11|/f=1.55.

When the focal length of the photographing lens assembly is f, a focal length of the fourth lens element 140 is f4, the following condition is satisfied: f/f4=0.11.

When the focal length of the photographing lens assembly is f, a focal length of the fifth lens element 150 is f5, the following condition is satisfied: f/f5=−0.62.

When an axial distance between the stop 100 and the image-side surface 162 of the sixth lens element 160 is SD, an axial distance between the object-side surface 111 of the first lens element 110 and the image-side surface 162 of the sixth lens element 160 is TD, the following condition is satisfied: SD/TD=0.99.

When an axial distance between the image-side surface 162 of the sixth lens element 160 and the image surface 180 is BL, the axial distance between the object-side surface 111 of the first lens element 110 and the image-side surface 162 of the sixth lens element 160 is TD, the following condition is satisfied: BL/TD=0.17.

When an axial distance between the object-side surface 111 of the first lens element 110 and the image surface 180 is TL, the following condition is satisfied: TL=4.03 mm.

The detailed optical data of the 1st embodiment are shown in Table 1 and the aspheric surface data are shown in Table 2 below.

TABLE 1

1st Embodiment f = 3.33 mm, Fno = 2.90, HFOV = 31.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.037 | | | | |
| 2 | Lens 1 | 1.298 | (ASP) | 0.429 | Plastic | 1.544 | 55.9 | 2.69 |
| 3 | | 10.047 | (ASP) | 0.186 | | | | |
| 4 | Lens 2 | 8.553 | (ASP) | 0.249 | Plastic | 1.650 | 21.4 | −5.05 |
| 5 | | 2.343 | (ASP) | 0.272 | | | | |
| 6 | Lens 3 | 2.029 | (ASP) | 0.407 | Plastic | 1.544 | 55.9 | 4.80 |
| 7 | | 8.454 | (ASP) | 0.324 | | | | |
| 8 | Lens 4 | −0.599 | (ASP) | 0.274 | Plastic | 1.544 | 55.9 | 29.98 |
| 9 | | −0.671 | (ASP) | 0.081 | | | | |
| 10 | Lens 5 | 2.714 | (ASP) | 0.594 | Plastic | 1.650 | 21.4 | −5.36 |
| 11 | | 1.394 | (ASP) | 0.150 | | | | |
| 12 | Lens 6 | −3.760 | (ASP) | 0.482 | Plastic | 1.544 | 55.9 | 25.71 |
| 13 | | −3.097 | (ASP) | 0.200 | | | | |
| 14 | IR-cut filter | Plano | | 0.248 | Glass | 1.517 | 64.2 | — |
| 15 | | Plano | | 0.129 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 |
|---|---|---|---|---|
| k = | −2.3417E−01 | −1.0000E+00 | 4.0607E+01 | −2.0585E+01 |
| A4 = | −2.6809E−02 | −1.4039E−01 | −1.8580E−01 | −1.5143E−02 |
| A6 = | −8.9153E−02 | −1.1661E−01 | 3.4828E−01 | 3.2803E−01 |
| A8 = | −1.1465E−01 | −2.0770E−01 | −3.1403E−01 | −1.1208E−01 |
| A10 = | −1.4576E−01 | −7.7714E−02 | 1.0540E−01 | 1.9620E−01 |
| A12 = | 1.0344E−01 | 3.6052E−01 | 6.1723E−01 | 1.1324E−01 |
| A14 = | −1.1003E+00 | −8.0358E−01 | −5.4790E−01 | 5.7873E−02 |

| Surface # | 6 | 7 | 8 | 9 |
|---|---|---|---|---|
| k = | −1.0000E+00 | −5.0000E+01 | −3.0777E+00 | −3.0984E+00 |
| A4 = | −2.3790E−01 | −2.8124E−02 | 1.9865E−01 | 1.3513E−01 |
| A6 = | −1.8700E−02 | −2.8135E−01 | −4.9785E−01 | −2.0956E−01 |
| A8 = | −1.0978E−01 | 4.7751E−02 | 4.2663E−01 | 1.8194E−01 |
| A10 = | 4.1248E−02 | 2.7421E−02 | −3.1365E−01 | −4.9021E−02 |
| A12 = | 3.4111E−02 | −1.0440E−01 | 2.4799E−01 | −1.1928E−02 |
| A14 = | −1.3379E−01 | 6.8073E−02 | −8.2421E−02 | 1.3784E−02 |

| | 10 | 11 | 12 | 13 |
|---|---|---|---|---|
| k = | 1.8411E+00 | −2.2529E+01 | −5.7341E+00 | −9.0000E+01 |
| A4 = | −4.4433E−01 | −2.2390E−01 | 8.6937E−03 | 3.5074E−02 |
| A6 = | 2.1178E−01 | 9.3984E−02 | 1.6553E−02 | −7.7590E−03 |
| A8 = | −7.8289E−02 | −1.1078E−02 | −1.4806E−02 | −2.6024E−03 |
| A10 = | −3.5234E−02 | −2.7090E−02 | 1.4966E−03 | 3.9171E−04 |
| A12 = | −4.1747E−02 | 1.5440E−02 | 1.1518E−02 | −1.8004E−04 |
| A14 = | 4.2197E−02 | −2.3749E−03 | −2.2148E−04 | 4.0802E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
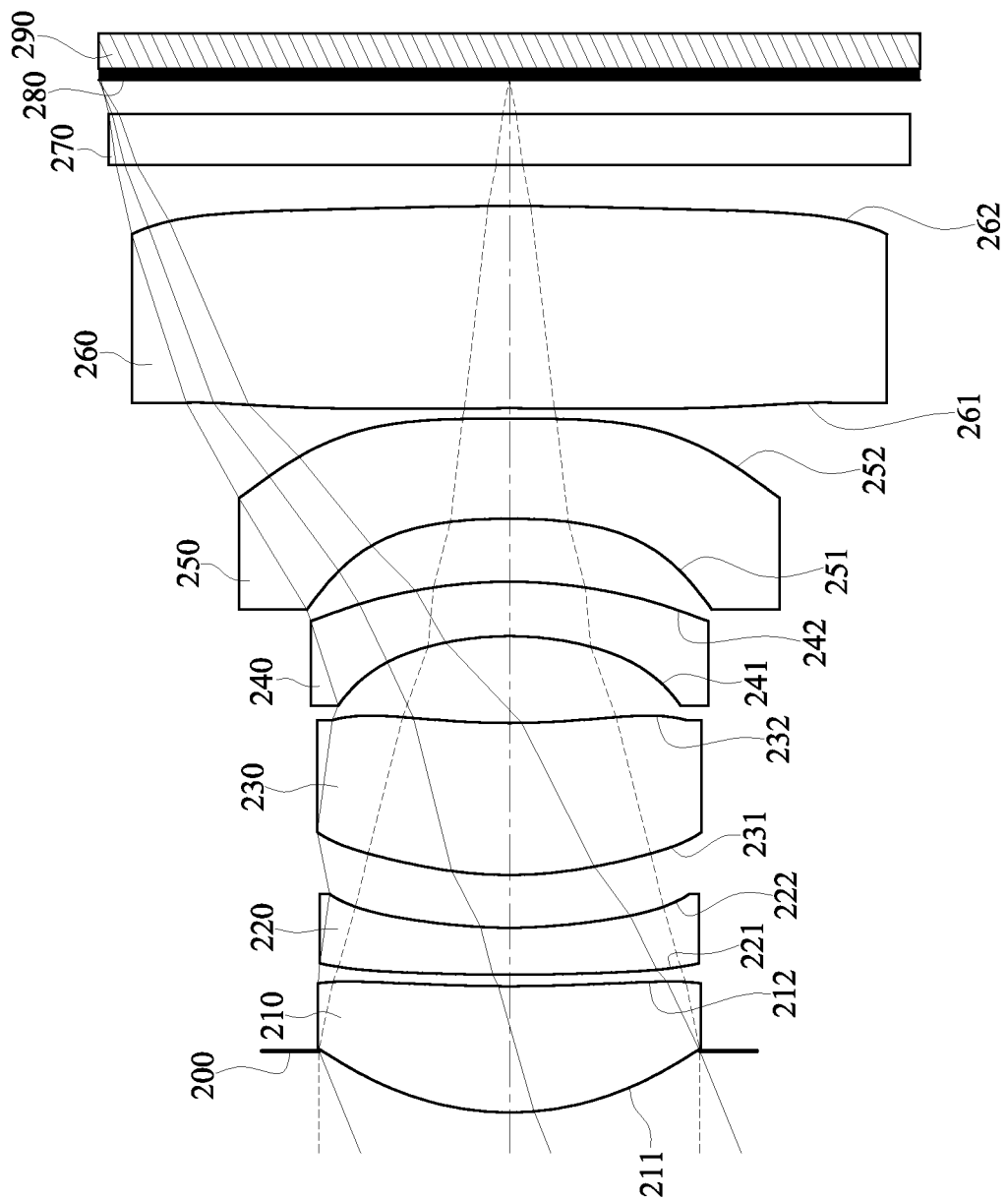
FIG. 3 is a schematic view of an image capturing unit according to the 2nd embodiment of the present disclosure.
Figure 4:
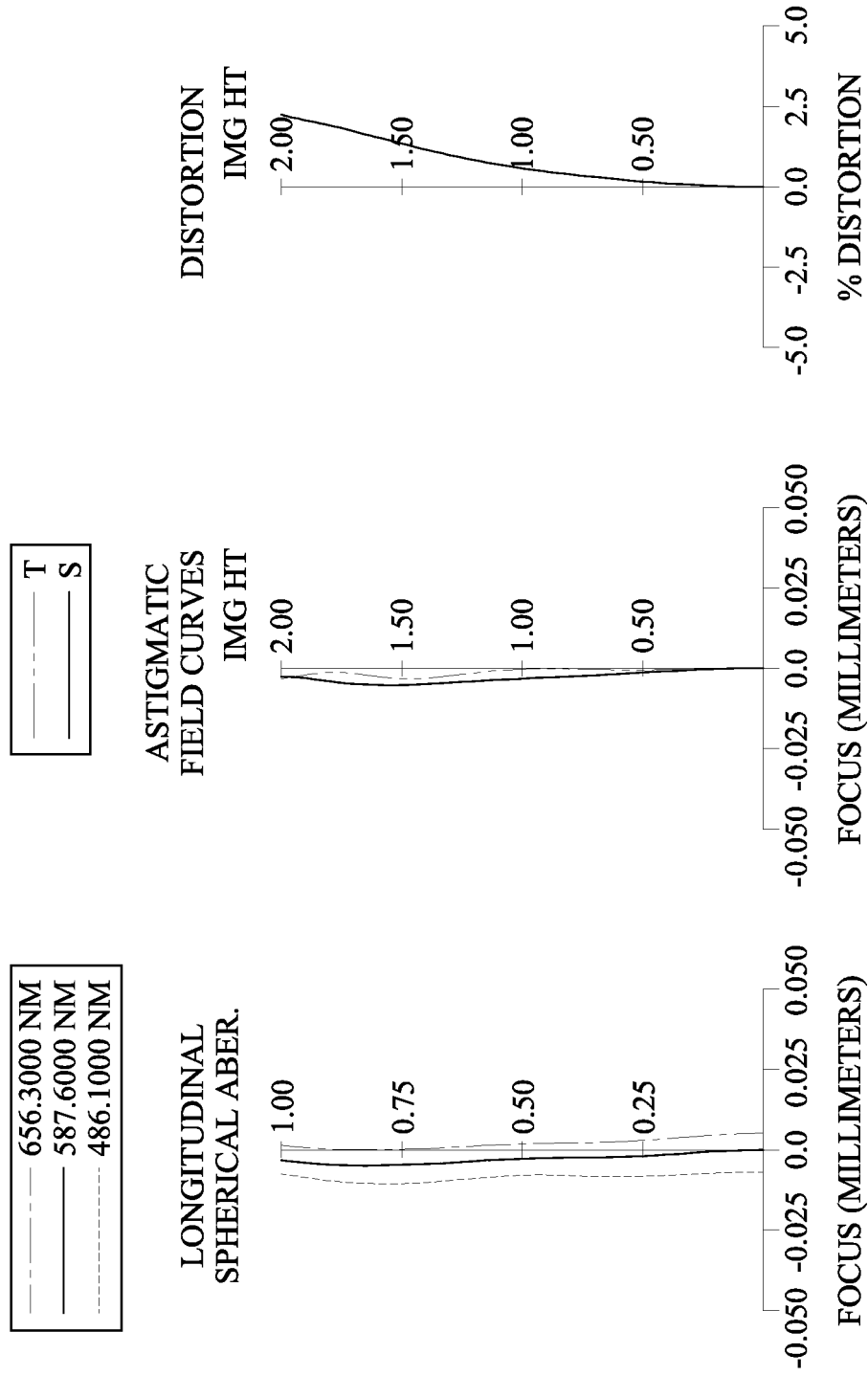
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 290. The photographing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the photographing lens assembly has a total of six lens elements (210-260) with refractive power. There is an air gap in a paraxial region between every two of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with positive refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point.

The IR-cut filter 270 is made of glass and located between the sixth lens element 260 and the image surface 280, and will not affect the focal length of the photographing lens assembly. The image sensor 290 is disposed on or near the image surface 280 of the photographing lens assembly.

The detailed optical data of the 2nd embodiment are shown in Table 3 and the aspheric surface data are shown in Table 4 below.

TABLE 3

2nd Embodiment
f = 4.82 mm, Fno = 2.60, HFOV = 22.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.300 | | | | |

TABLE 3-continued

2nd Embodiment
f = 4.82 mm, Fno = 2.60, HFOV = 22.1 deg.

| Surface # | | Curvature Radius | | Thickness | Material | Index | Abbe # | Focal Length |
|---|---|---|---|---|---|---|---|---|
| 2 | Lens 1 | 1.457 | (ASP) | 0.615 | Plastic | 1.544 | 55.9 | 3.23 |
| 3 | | 7.214 | (ASP) | 0.055 | | | | |
| 4 | Lens 2 | 7.114 | (ASP) | 0.230 | Plastic | 1.640 | 23.3 | −6.25 |
| 5 | | 2.528 | (ASP) | 0.257 | | | | |
| 6 | Lens 3 | 1.933 | (ASP) | 0.741 | Plastic | 1.544 | 55.9 | 6.27 |
| 7 | | 3.852 | (ASP) | 0.423 | | | | |
| 8 | Lens 4 | −1.545 | (ASP) | 0.266 | Plastic | 1.640 | 23.3 | −9.59 |
| 9 | | −2.204 | (ASP) | 0.307 | | | | |
| 10 | Lens 5 | −2.857 | (ASP) | 0.488 | Plastic | 1.544 | 55.9 | −6.20 |
| 11 | | −19.801 | (ASP) | 0.050 | | | | |
| 12 | Lens 6 | −43.290 | (ASP) | 0.985 | Plastic | 1.640 | 23.3 | 47.32 |
| 13 | | −17.974 | (ASP) | 0.200 | | | | |
| 14 | IR-cut filter | Plano | | 0.248 | Glass | 1.517 | 64.2 | — |
| 15 | | Plano | | 0.167 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 1.2718E−01 | −1.0000E+00 | 3.9195E+01 | −1.4625E+01 | −1.0000E+00 | 1.5009E+00 |
| A4 = | −1.2860E−02 | −8.9762E−02 | −1.7783E−01 | −6.8729E−02 | −1.1279E−01 | −5.9968E−02 |
| A6 = | −2.4541E−02 | 1.3323E−01 | 3.5819E−01 | 2.4564E−01 | 6.1066E−02 | −1.3833E−01 |
| A8 = | 3.4839E−02 | −6.7839E−02 | −2.8381E−01 | −1.6044E−01 | −9.7025E−03 | 3.6815E−02 |
| A10 = | −8.6955E−02 | −1.7173E−01 | 5.9882E−03 | 9.0750E−02 | 6.2132E−02 | −2.3661E−02 |
| A12 = | 7.3040E−02 | 1.8997E−01 | 1.5542E−01 | 4.6076E−02 | −2.6760E−02 | −6.6385E−02 |
| A14 = | −4.0788E−02 | −6.3126E−02 | −7.4230E−02 | −3.3975E−03 | 3.6183E−02 | 7.2648E−02 |

| Surface # | 8 | 9 | 10 | 11 | 12 | 13 |
|---|---|---|---|---|---|---|
| k = | −1.0000E+00 | 1.6409E+00 | −1.7541E+01 | −1.0000E+00 | −5.0000E+01 | −9.0000E+01 |
| A4 = | 4.7078E−02 | 1.7804E−01 | −3.0692E−01 | −1.9620E−01 | 1.1646E−02 | 8.2326E−03 |
| A6 = | −4.6360E−01 | −2.7335E−01 | −2.3638E−02 | 5.7040E−02 | 8.2207E−03 | 8.9025E−04 |
| A8 = | 2.8867E−01 | 1.6811E−01 | −8.7088E−03 | 2.0452E−04 | −6.0496E−03 | −3.0102E−03 |
| A10 = | −4.6729E−01 | −9.7365E−03 | −3.2491E−02 | −2.2124E−02 | 9.6119E−04 | 8.6102E−04 |
| A12 = | 2.4733E−01 | 4.8078E−03 | −5.5958E−02 | 1.7412E−02 | 1.3237E−04 | −1.4336E−04 |
| A14 = | 1.1586E−02 | 1.2087E−03 | 9.4652E−02 | −3.8062E−03 | −5.8389E−05 | 8.1231E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.82 | (R11 − R12)/(R11 + R12) | 0.41 |
| Fno | 2.60 | R12/|R11| | −0.42 |
| HFOV [deg.] | 22.1 | |R10 − R11|/f | 4.87 |
| Nmax | 1.640 | f/f4 | −0.50 |
| CT3/T34 | 1.75 | f/f5 | −0.78 |
| T23/T34 | 0.61 | SD/TD | 0.93 |
| T45/T34 | 0.73 | BL/TD | 0.14 |
| (R5 + R6)/(R5 − R6) | −3.01 | TL [mm] | 5.03 |
| (R7 − R8)/(R7 + R8) | −0.18 | | |

3rd Embodiment

Figure 5:
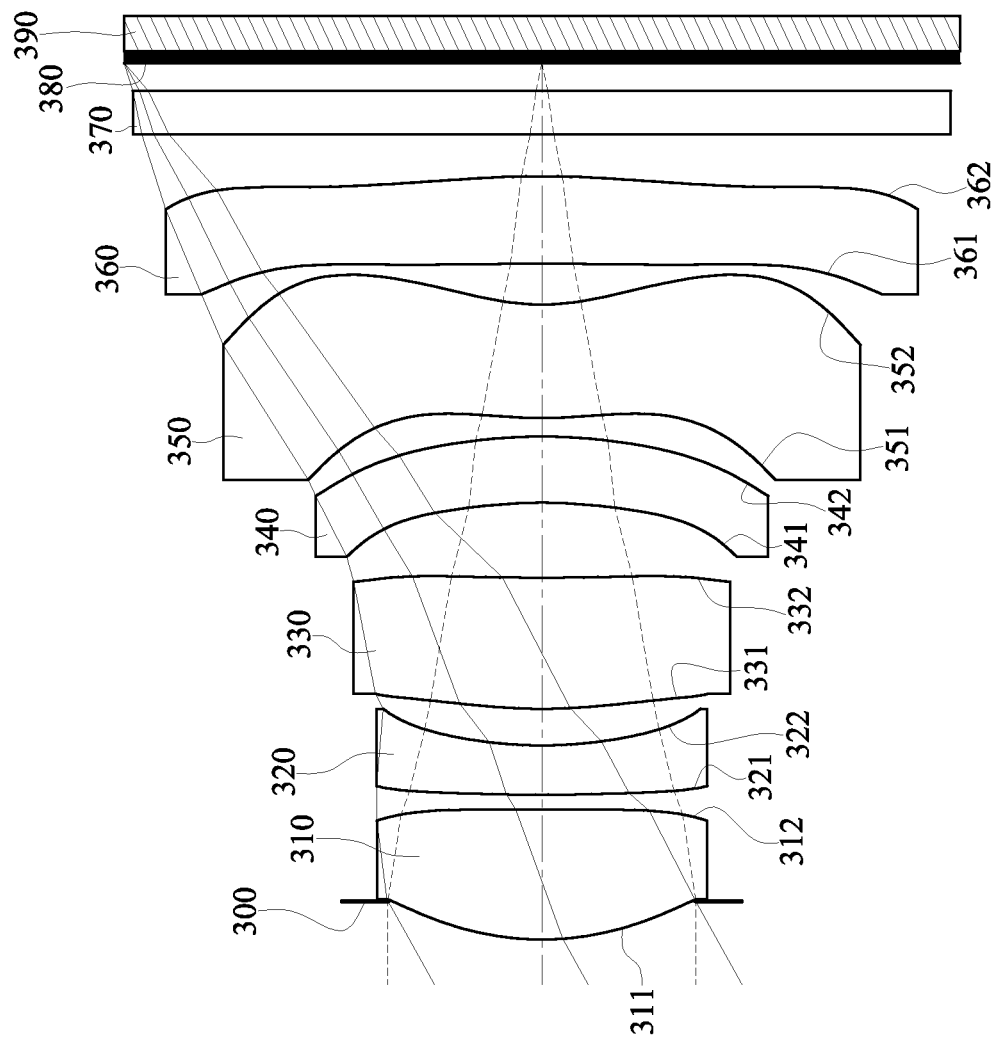
FIG. 5 is a schematic view of an image capturing unit according to the 3rd embodiment of the present disclosure.
Figure 6:
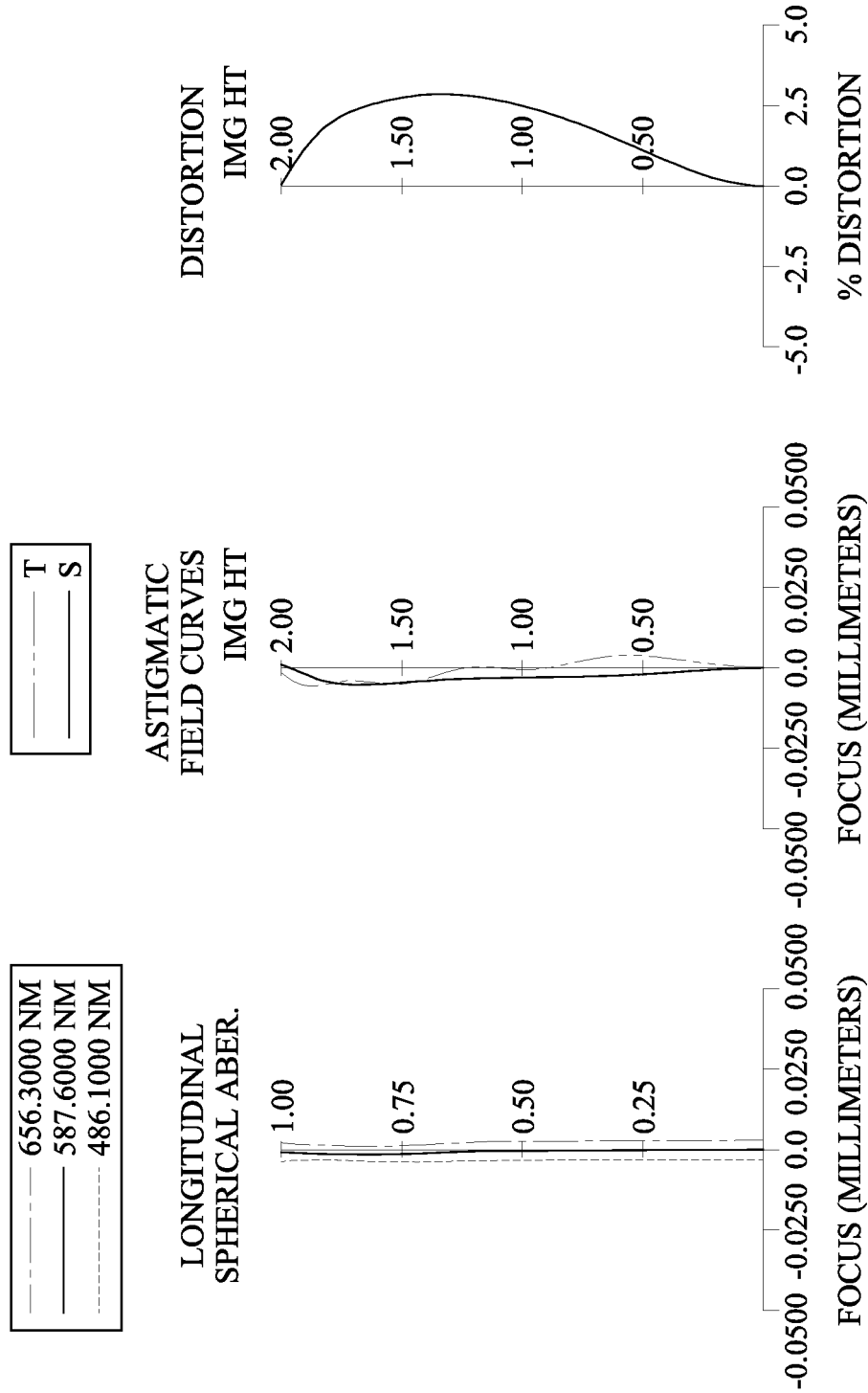
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 390. The photographing lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the photographing lens assembly has a total of six lens elements (310-360) with refractive power. There is an air gap in a paraxial region between every two of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of sixth lens element 360 has at least one inflection point.

The IR-cut filter 370 is made of glass and located between the sixth lens element 360 and the image surface 380, and will not affect the focal length of the photographing lens assembly. The image sensor 390 is disposed on or near the image surface 380 of the photographing lens assembly.

The detailed optical data of the 3rd embodiment are shown in Table 5 and the aspheric surface data are shown in Table 6 below.

TABLE 5

3rd Embodiment
f = 3.61 mm, Fno = 2.45, HFOV = 29.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.184 | | | | |
| 2 | Lens 1 | 1.376 | (ASP) | 0.623 | Plastic | 1.544 | 55.9 | 2.60 |
| 3 | | 44.071 | (ASP) | 0.071 | | | | |
| 4 | Lens 2 | 8.523 | (ASP) | 0.236 | Plastic | 1.640 | 23.3 | −4.09 |
| 5 | | 1.981 | (ASP) | 0.176 | | | | |
| 6 | Lens 3 | 2.648 | (ASP) | 0.628 | Plastic | 1.544 | 55.9 | 6.44 |
| 7 | | 9.952 | (ASP) | 0.360 | | | | |
| 8 | Lens 4 | −2.231 | (ASP) | 0.317 | Plastic | 1.640 | 23.3 | −55.18 |
| 9 | | −2.513 | (ASP) | 0.089 | | | | |
| 10 | Lens 5 | 2.150 | (ASP) | 0.544 | Plastic | 1.544 | 55.9 | −4.67 |
| 11 | | 1.061 | (ASP) | 0.195 | | | | |
| 12 | Lens 6 | −21.896 | (ASP) | 0.420 | Plastic | 1.544 | 55.9 | 9.50 |
| 13 | | −4.210 | (ASP) | 0.200 | | | | |
| 14 | IR-cut filter | Plano | | 0.210 | Glass | 1.517 | 64.2 | — |
| 15 | | Plano | | 0.133 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −1.0225E−01 | −1.0000E+00 | 7.7005E+01 | −9.6828E+00 | −1.0000E+00 | −1.0386E+01 |
| A4 = | −2.1550E−02 | −1.1218E−01 | −1.4011E−01 | −1.0672E−02 | −1.8990E−01 | −2.6408E−02 |
| A6 = | −4.8157E−02 | −2.7792E−02 | 3.2912E−01 | 3.4305E−01 | 4.3859E−02 | −2.0901E−01 |
| A8 = | −1.6315E−02 | −8.9686E−02 | −3.9539E−01 | −1.6648E−01 | 4.7467E−02 | 1.7728E−01 |
| A10 = | −6.3356E−02 | −1.2621E−01 | 1.7716E−01 | 1.5910E−01 | 4.2225E−01 | 1.0549E−03 |
| A12 = | −6.5097E−02 | 4.8763E−01 | 4.4906E−01 | 4.0276E−01 | −1.5393E−01 | −1.5329E−01 |
| A14 = | 9.7823E−03 | −3.5607E−01 | −3.9213E−01 | −1.2749E−02 | 3.7420E−01 | 1.5750E−01 |

| Surface # | 8 | 9 | 10 | 11 | 12 | 13 |
|---|---|---|---|---|---|---|
| k = | −2.2629E+01 | 1.1927E+00 | −2.0000E+01 | −6.4299E+00 | −5.0000E+01 | −9.0000E+01 |
| A4 = | 1.1135E−01 | 1.1363E−01 | −5.2245E−01 | −2.1332E−01 | 3.4732E−02 | 2.1403E−02 |
| A6 = | −6.0998E−01 | −2.5141E−01 | 3.2012E−01 | 1.2211E−01 | −3.6358E−03 | −1.2403E−03 |
| A8 = | 5.8383E−01 | 1.7687E−01 | −1.1746E−01 | −3.4410E−02 | −1.4908E−02 | −5.6478E−04 |

TABLE 6-continued

| Aspheric Coefficients | | | | | | |
|---|---|---|---|---|---|---|
| A10 = | −3.6264E−01 | −6.2520E−02 | 7.0635E−03 | −2.5702E−02 | 1.9078E−03 | 7.3108E−05 |
| A12 = | −8.5500E−02 | −3.4443E−03 | −4.0352E−02 | 1.6141E−02 | 1.2529E−03 | −3.4931E−04 |
| A14 = | 1.7467E−01 | 1.3878E−02 | 3.1165E−02 | −2.3361E−03 | −2.3086E−04 | 6.6601E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.61 | (R11 − R12)/(R11 + R12) | 0.68 |
| Fno | 2.45 | R12/|R11| | −0.19 |
| HFOV [deg.] | 29.0 | |R10 − R11|/f | 6.36 |
| Nmax | 1.640 | f/f4 | −0.07 |
| CT3/T34 | 1.74 | f/f5 | −0.77 |
| T23/T34 | 0.49 | SD/TD | 0.95 |
| T45/T34 | 0.25 | BL/TD | 0.15 |
| (R5 + R6)/(R5 − R6) | −1.73 | TL [mm] | 4.20 |
| (R7 − R8)/(R7 + R8) | −0.06 | | |

4th Embodiment

Figure 7:
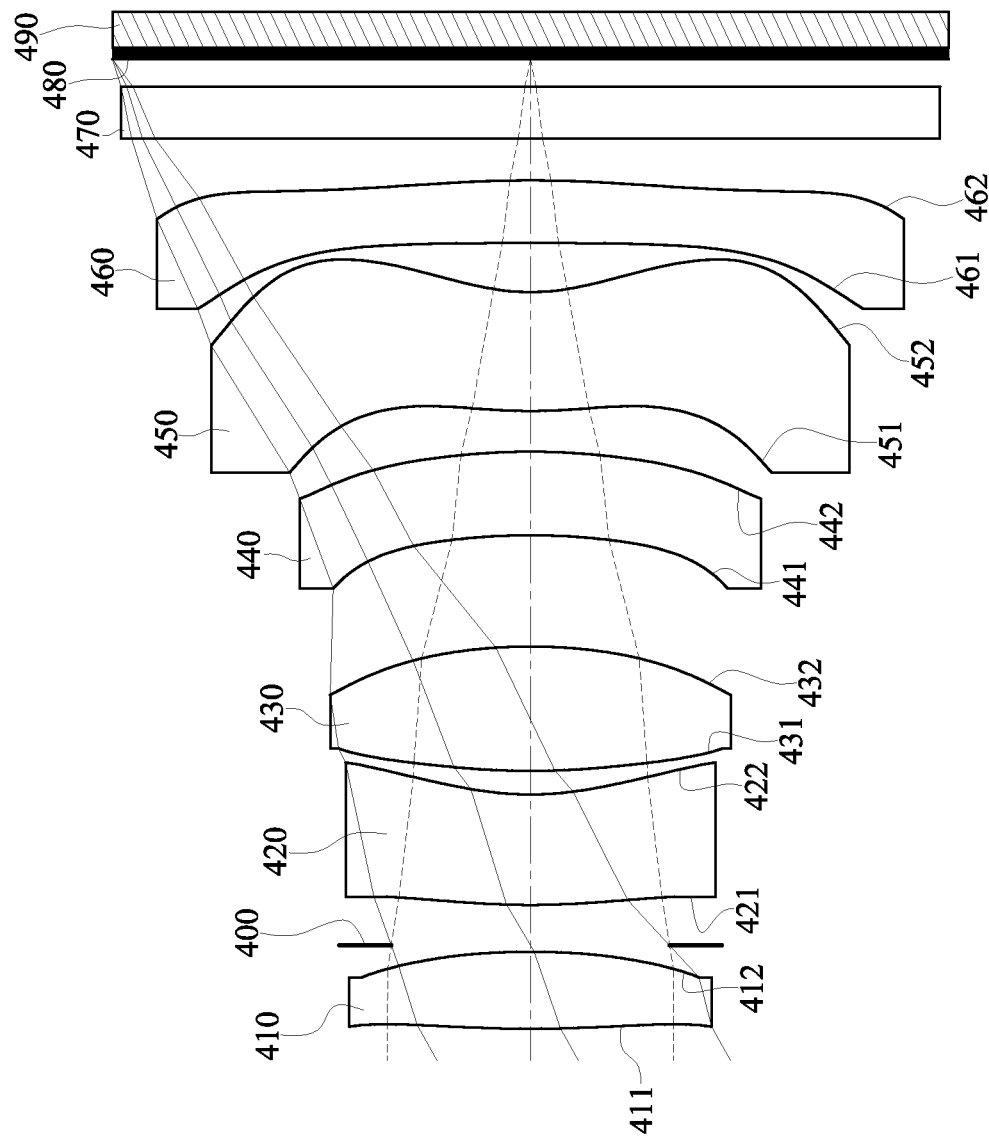
FIG. 7 is a schematic view of an image capturing unit according to the 4th embodiment of the present disclosure.
Figure 8:
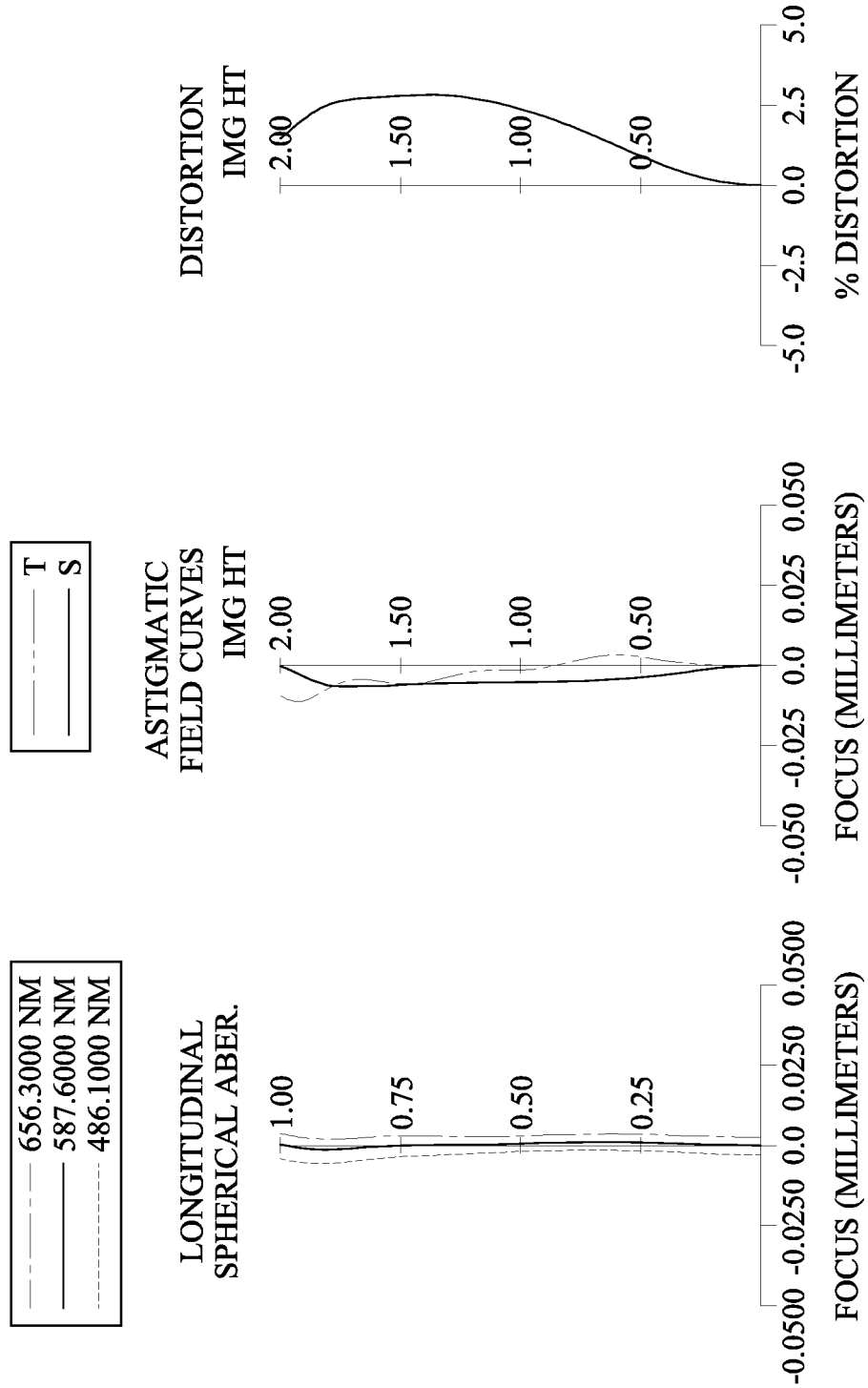
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 490. The photographing lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the photographing lens assembly has a total of six lens elements (410-460) with refractive power. There is an air gap in a paraxial region between every two of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point.

The IR-cut filter 470 is made of glass and located between the sixth lens element 460 and the image surface 480, and will not affect the focal length of the photographing lens assembly. The image sensor 490 is disposed on or near the image surface 480 of the photographing lens assembly.

The detailed optical data of the 4th embodiment are shown in Table 7 and the aspheric surface data are shown in Table 8 below.

TABLE 7

4th Embodiment
f = 3.52 mm, Fno = 2.57, HFOV = 29.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.320 (ASP) | 0.369 | Plastic | 1.544 | 55.9 | 4.09 |

TABLE 7-continued

4th Embodiment
f = 3.52 mm, Fno = 2.57, HFOV = 29.2 deg.

| Surface # | | Curvature Radius | | Thickness | Material | Index | Abbe # | Focal Length |
|---|---|---|---|---|---|---|---|---|
| 2 | | −3.365 | (ASP) | 0.030 | | | | |
| 3 | Ape. Stop | Plano | | 0.194 | | | | |
| 4 | Lens 2 | 3.528 | (ASP) | 0.530 | Plastic | 1.640 | 23.3 | −4.38 |
| 5 | | 1.470 | (ASP) | 0.113 | | | | |
| 6 | Lens 3 | 3.432 | (ASP) | 0.596 | Plastic | 1.544 | 55.9 | 2.81 |
| 7 | | −2.588 | (ASP) | 0.534 | | | | |
| 8 | Lens 4 | −2.929 | (ASP) | 0.400 | Plastic | 1.640 | 23.3 | −90.33 |
| 9 | | −3.249 | (ASP) | 0.195 | | | | |
| 10 | Lens 5 | 2.371 | (ASP) | 0.570 | Plastic | 1.544 | 55.9 | −3.69 |
| 11 | | 0.995 | (ASP) | 0.236 | | | | |
| 12 | Lens 6 | −43.290 | (ASP) | 0.300 | Plastic | 1.544 | 55.9 | 11.04 |
| 13 | | −5.286 | (ASP) | 0.200 | | | | |
| 14 | IR-cut filter | Plano | | 0.248 | Glass | 1.517 | 64.2 | — |
| 15 | | Plano | | 0.133 | | | | |
| 16 | Image | Plano | | — | | | | |

Note:
Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | 4.9603E−01 | −1.0000E+00 | 1.3183E+01 | −6.2821E+00 | −1.0000E+00 | −1.8676E+00 |
| A4 = | −6.6620E−02 | −9.0589E−02 | −2.3468E−01 | −1.1473E−01 | −1.0515E−01 | −4.4129E−02 |
| A6 = | −1.6188E−02 | 1.4886E−01 | 2.7849E−01 | 1.4583E−01 | 8.5972E−02 | −9.8688E−02 |
| A8 = | 2.9899E−02 | −1.5991E−01 | −4.1209E−01 | −1.7985E−01 | 1.3136E−02 | 9.3940E−02 |
| A10 = | −1.0378E−01 | −1.2666E−01 | 4.9345E−01 | 1.1253E−01 | 2.3625E−02 | −4.8994E−05 |
| A12 = | 1.0062E−01 | 3.3688E−01 | 3.4274E−01 | −2.8277E−02 | −4.6174E−02 | −6.8198E−02 |
| A14 = | −6.3444E−02 | −2.0644E−01 | −3.9035E−01 | −9.8233E−03 | 2.1100E−02 | 5.2555E−02 |

| Surface # | 8 | 9 | 10 | 11 | 12 | 13 |
|---|---|---|---|---|---|---|
| k = | −6.5326E+00 | 1.9599E+00 | 1.8472E+00 | −4.8893E+00 | −5.0000E+01 | −9.0000E+01 |
| A4 = | 1.0589E−01 | 8.3105E−02 | −5.6220E−01 | −2.3016E−01 | −2.7902E−02 | 1.3650E−02 |
| A6 = | −4.8937E−01 | −2.0227E−01 | 2.8540E−01 | 1.1134E−01 | 5.0618E−03 | 2.8433E−03 |
| A8 = | 4.6954E−01 | 1.6358E−01 | −8.0097E−02 | −3.2747E−02 | −1.3654E−02 | −1.1332E−03 |
| A10 = | −3.6505E−01 | −6.8366E−02 | −7.7121E−03 | −2.5509E−02 | 1.9422E−03 | −1.2545E−04 |
| A12 = | 1.2217E−01 | −1.0448E−02 | −5.3454E−02 | 1.6508E−02 | 1.2098E−03 | −3.5246E−04 |
| A14 = | −1.8399E−02 | 2.0657E−02 | 3.4221E−02 | −2.4015E−03 | −2.2286E−04 | 7.5869E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.52 | (R11 − R12)/(R11 + R12) | 0.78 |
| Fno | 2.57 | R12/|R11| | −0.12 |
| HFOV [deg.] | 29.2 | |R10 − R11|/f | 12.58 |
| Nmax | 1.640 | f/f4 | −0.04 |
| CT3/T34 | 1.12 | f/f5 | −0.95 |
| T23/T34 | 0.21 | SD/TD | 0.90 |
| T45/T34 | 0.37 | BL/TD | 0.14 |
| (R5 + R6)/(R5 − R6) | 0.14 | TL [mm] | 4.65 |
| (R7 − R8)/(R7 + R8) | −0.05 | | |

5th Embodiment

Figure 9:
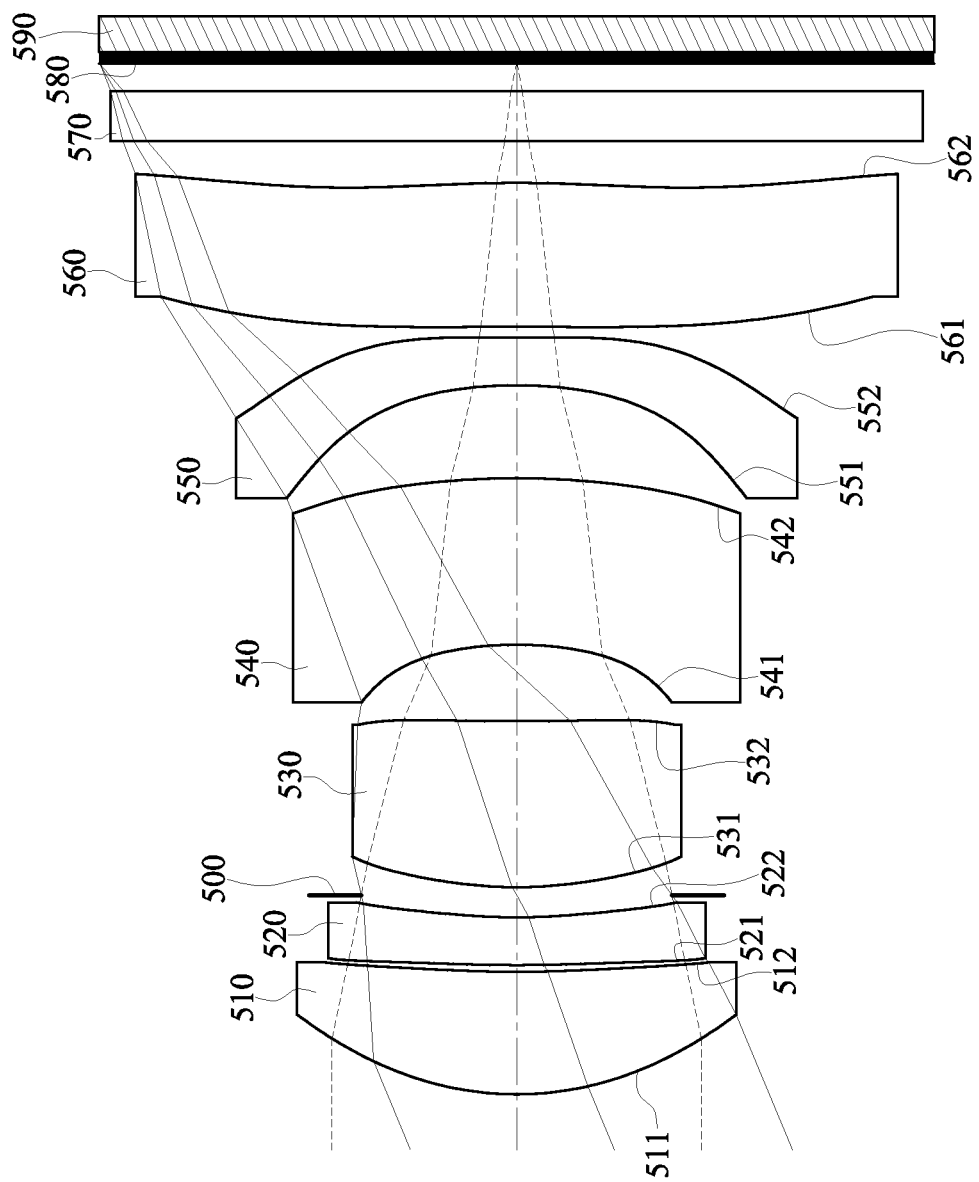
FIG. 9 is a schematic view of an image capturing unit according to the 5th embodiment of the present disclosure.
Figure 10:
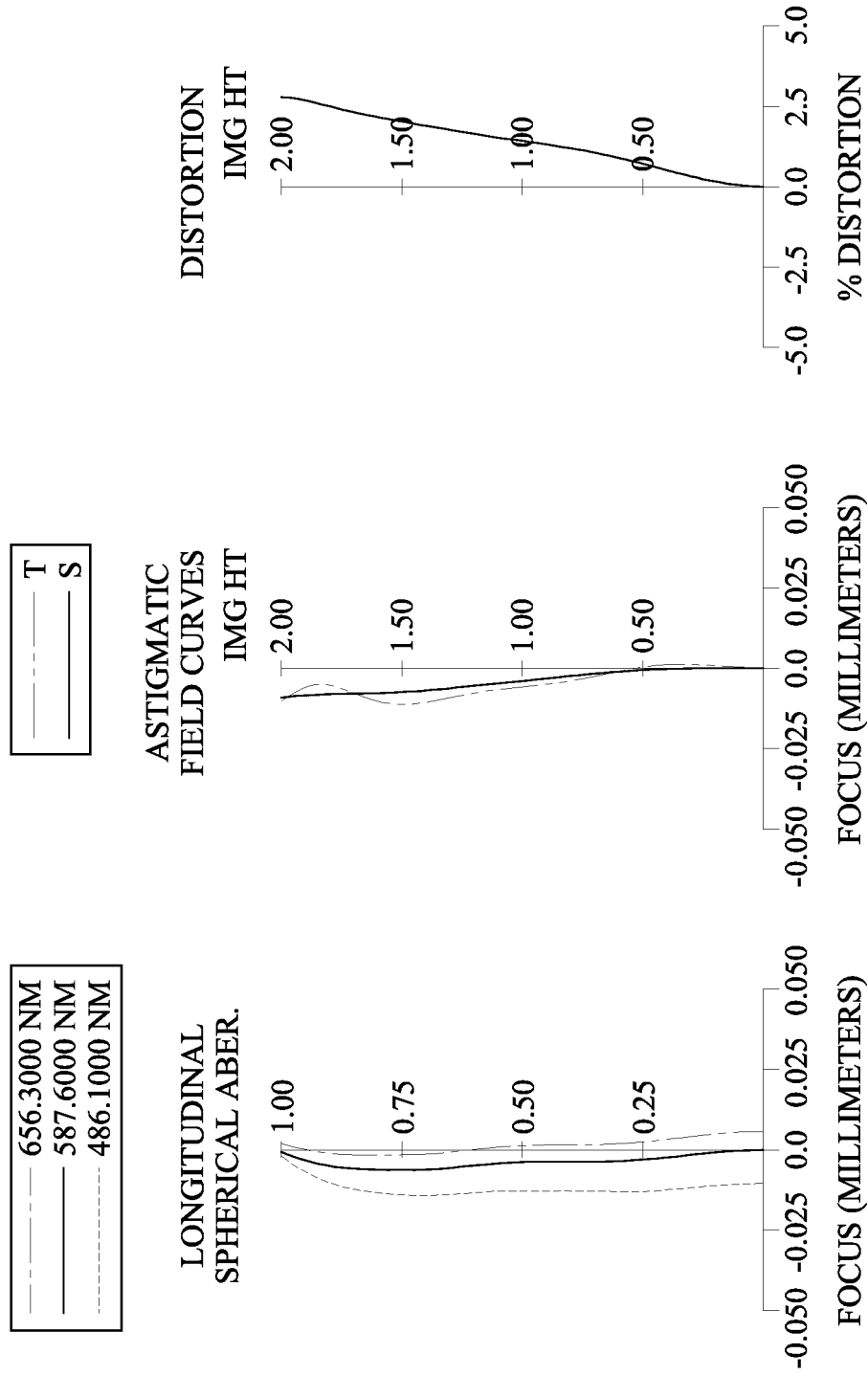
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 590. The photographing lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the photographing lens assembly has a total of six lens elements (510-560) with refractive power. There is an air gap in a paraxial region between every two of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one inflection point.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The image-side surface 562 of the sixth lens element 560 has at least one inflection point.

The IR-cut filter 570 is made of glass and located between the sixth lens element 560 and the image surface 580, and will not affect the focal length of the photographing lens assembly. The image sensor 590 is disposed on or near the image surface 580 of the photographing lens assembly.

The detailed optical data of the 5th embodiment are shown in Table 9 and the aspheric surface data are shown in Table 10 below.

TABLE 9

5th Embodiment
f = 4.69 mm, Fno = 2.65, HFOV = 22.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.521 | 0.587 | Plastic | 1.535 | 55.7 | 3.74 |
| 2 | | 5.473 (ASP) | 0.032 | | | | |
| 3 | Lens 2 | 6.195 (ASP) | 0.230 | Plastic | 1.640 | 23.3 | −9.30 |
| 4 | | 2.991 (ASP) | 0.105 | | | | |
| 5 | Ape. Stop | Plano | 0.039 | | | | |
| 6 | Lens 3 | 2.039 (ASP) | 0.795 | Plastic | 1.544 | 55.9 | 4.68 |
| 7 | | 8.800 (ASP) | 0.367 | | | | |
| 8 | Lens 4 | −1.879 (ASP) | 0.799 | Plastic | 1.640 | 23.3 | −7.14 |
| 9 | | −3.723 (ASP) | 0.445 | | | | |
| 10 | Lens 5 | −2.217 (ASP) | 0.230 | Plastic | 1.535 | 55.7 | −3.95 |
| 11 | | 45.872 (ASP) | 0.050 | | | | |
| 12 | Lens 6 | −43.290 (ASP) | 0.691 | Plastic | 1.640 | 23.3 | 10.44 |
| 13 | | −5.825 (ASP) | 0.200 | | | | |
| 14 | IR-cut filter | Plano | 0.240 | Glass | 1.517 | 64.2 | — |
| 15 | | Plano | 0.132 | | | | |
| 16 | Image | Plano | — | | | | |

Note:
Reference wavelength is 587.6 nm (d-line).

TABLE 10

Aspheric Coefficients

| Surface # | 1 | 2 | 3 | 4 | 6 | 7 |
|---|---|---|---|---|---|---|
| k = | 3.0030E−01 | −1.0000E+00 | 2.2771E+01 | −2.9200E+01 | −1.0000E+00 | −2.7887E+01 |
| A4 = | −2.5446E−02 | −1.2561E−01 | −1.9626E−01 | −8.6845E−02 | −1.3500E−01 | −9.1241E−02 |
| A6 = | −2.9499E−02 | 1.5512E−01 | 3.0768E−01 | 1.8907E−01 | 1.9922E−01 | −1.0660E−01 |
| A8 = | 3.7232E−02 | −5.4824E−02 | −2.6844E−01 | −1.8925E−01 | −8.8442E−02 | 4.5814E−02 |
| A10 = | −7.8839E−02 | −1.3807E−01 | 2.0226E−01 | 1.6763E−01 | 3.3669E−02 | −6.0048E−02 |
| A12 = | 7.0235E−02 | 2.1461E−01 | 1.6763E−01 | −5.2260E−02 | 2.4023E−01 | −7.3616E−02 |
| A14 = | −2.5091E−02 | −8.5981E−02 | −7.7997E−02 | 9.1113E−02 | −1.3830E−01 | 2.2832E−01 |

| Surface # | 8 | 9 | 10 | 11 | 12 | 13 |
|---|---|---|---|---|---|---|
| k = | −1.0000E+00 | 1.9261E+00 | −6.0186E+00 | −5.0000E+01 | 6.4452E+00 | −9.0000E+01 |
| A4 = | −2.0584E−01 | 6.1546E−02 | −2.1709E−01 | −2.5969E−01 | 4.1015E−02 | 5.8884E−02 |
| A6 = | −3.4022E−01 | −1.3483E−01 | −5.5720E−02 | 9.2062E−02 | −1.1685E−02 | −2.1723E−02 |
| A8 = | 2.6534E−01 | 1.1067E−01 | 6.4902E−02 | 2.4941E−03 | 2.3468E−03 | 2.0073E−03 |

TABLE 10-continued

| Aspheric Coefficients | | | | | | |
|---|---|---|---|---|---|---|
| A10 = | −1.1288E+00 | −4.3896E−02 | 2.2069E−02 | −2.5139E−02 | −3.1345E−04 | 6.8454E−04 |
| A12 = | 7.6579E−01 | −1.3494E−02 | −8.9877E−02 | 1.6174E−02 | 5.7533E−05 | −1.5921E−04 |
| A14 = | 1.2798E−01 | 1.6888E−02 | 4.8084E−02 | −3.3216E−03 | −1.0724E−05 | 4.4850E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.69 | (R11 − R12)/(R11 + R12) | 0.76 |
| Fno | 2.65 | R12/|R11| | −0.13 |
| HFOV [deg.] | 22.6 | |R10 − R11|/f | 19.02 |
| Nmax | 1.640 | f/f4 | −0.66 |
| CT3/T34 | 2.17 | f/f5 | −1.19 |
| T23/T34 | 0.39 | SD/TD | 0.78 |
| T45/T34 | 1.21 | BL/TD | 0.13 |
| (R5 + R6)/(R5 − R6) | −1.60 | TL [mm] | 4.94 |
| (R7 − R8)/(R7 + R8) | −0.33 | | |

6th Embodiment

Figure 11:
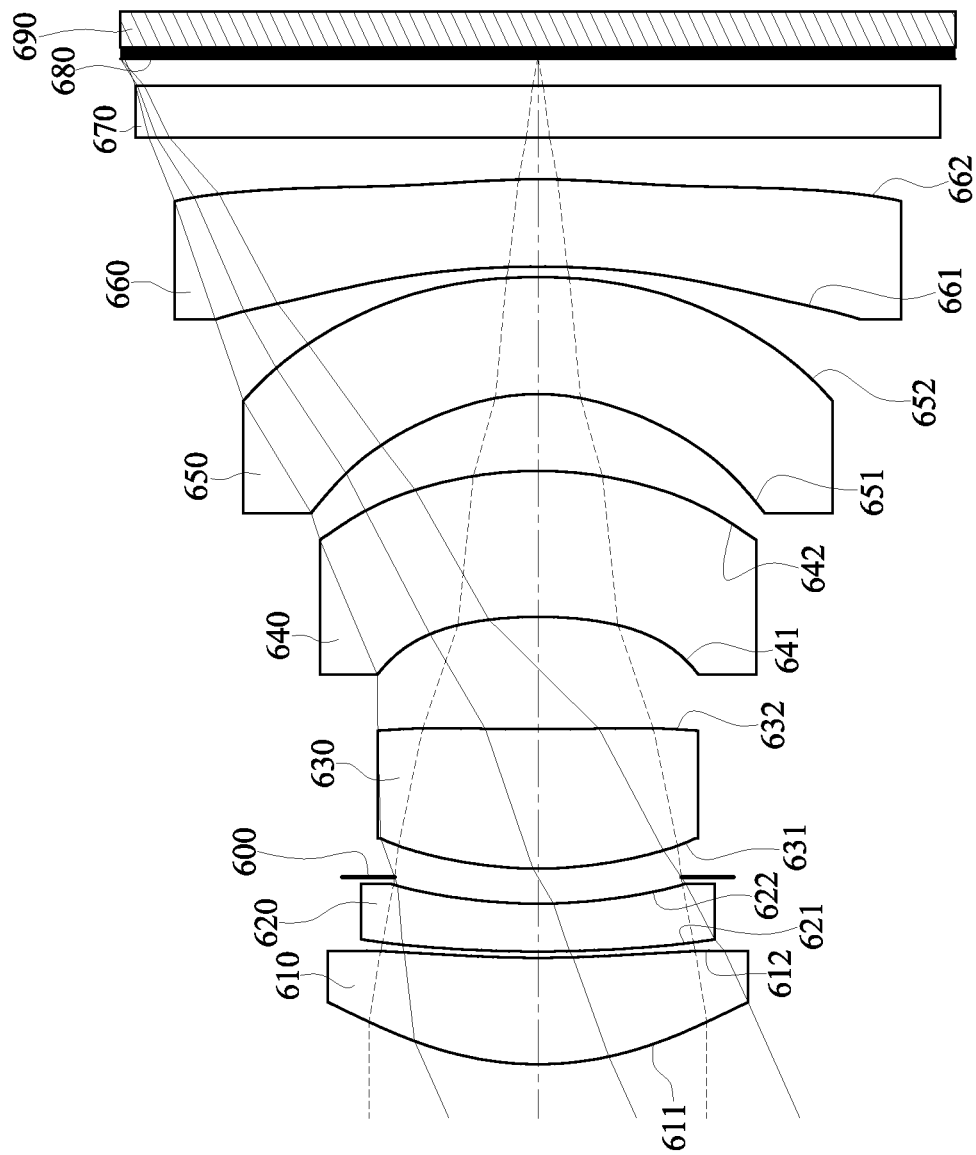
FIG. 11 is a schematic view of an image capturing unit according to the 6th embodiment of the present disclosure.
Figure 12:
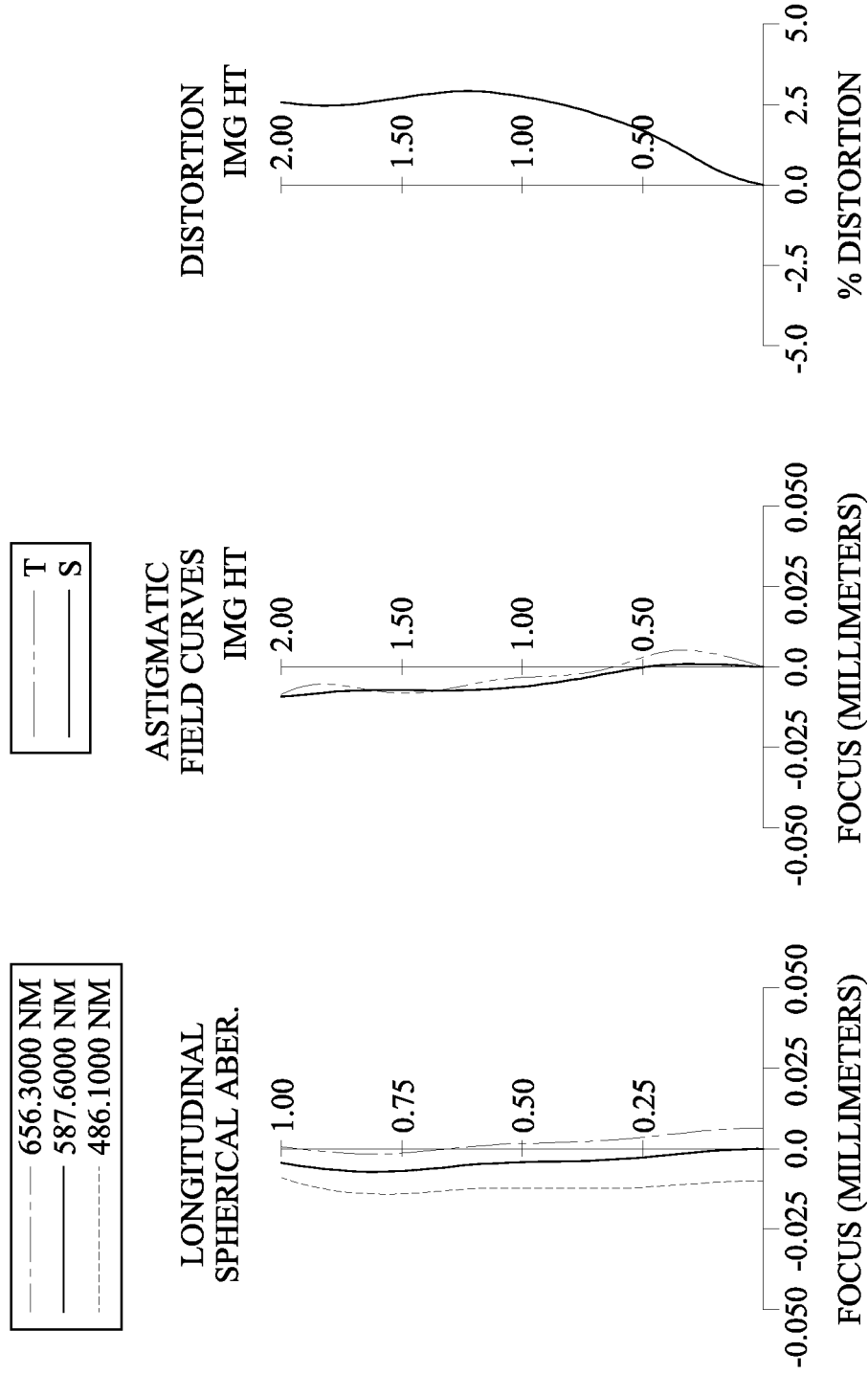
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 690. The photographing lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the photographing lens assembly has a total of six lens elements (610-660) with refractive power. There is an air gap in a paraxial region between every two of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The image-side surface 662 of the sixth lens element 660 has at least one inflection point.

The IR-cut filter 670 is made of glass and located between the sixth lens element 660 and the image surface 680, and will not affect the focal length of the photographing lens assembly. The image sensor 690 is disposed on or near the image surface 680 of the photographing lens assembly.

The detailed optical data of the 6th embodiment are shown in Table 11 and the aspheric surface data are shown in Table 12 below.

TABLE 11

6th Embodiment
f = 4.37 mm, Fno = 2.70, HFOV = 24.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.573 | (ASP) | 0.510 | Plastic | 1.544 | 55.9 | 4.02 |
| 2 | | 4.961 | (ASP) | 0.030 | | | | |
| 3 | Lens 2 | 5.127 | (ASP) | 0.230 | Plastic | 1.639 | 23.5 | −7.72 |
| 4 | | 2.470 | (ASP) | 0.127 | | | | |

TABLE 11-continued

6th Embodiment
f = 4.37 mm, Fno = 2.70, HFOV = 24.1 deg.

| Surface # | | Curvature Radius | | Thickness | Material | Index | Abbe # | Focal Length |
|---|---|---|---|---|---|---|---|---|
| 5 | Ape. Stop | Plano | | 0.041 | | | | |
| 6 | Lens 3 | 1.941 | (ASP) | 0.668 | Plastic | 1.544 | 55.9 | 4.15 |
| 7 | | 12.086 | (ASP) | 0.539 | | | | |
| 8 | Lens 4 | −2.115 | (ASP) | 0.700 | Plastic | 1.608 | 25.7 | 11.70 |
| 9 | | −1.834 | (ASP) | 0.368 | | | | |
| 10 | Lens 5 | −1.041 | (ASP) | 0.561 | Plastic | 1.608 | 25.7 | −3.42 |
| 11 | | −2.507 | (ASP) | 0.050 | | | | |
| 12 | Lens 6 | −4.817 | (ASP) | 0.419 | Plastic | 1.544 | 55.9 | 19.95 |
| 13 | | −3.439 | (ASP) | 0.200 | | | | |
| 14 | IR-cut filter | Plano | | 0.248 | Glass | 1.517 | 64.2 | — |
| 15 | | Plano | | 0.130 | | | | |
| 16 | Image | Plano | | — | | | | |

Note:
Reference wavelength is 587.6 nm (d-line).

TABLE 12

Aspheric Coefficients

| Surface # | 1 | 2 | 3 | 4 | 6 | 7 |
|---|---|---|---|---|---|---|
| k = | 1.4634E−01 | −1.0000E+00 | 2.2832E+01 | −1.6308E+01 | −1.0000E+00 | −3.6307E+01 |
| A4 = | −3.1610E−02 | −1.3135E−01 | −1.6035E−01 | −1.3683E−02 | −1.0388E−01 | −8.1309E−02 |
| A6 = | −3.9050E−02 | 1.4198E−01 | 3.1479E−01 | 2.2372E−01 | 1.7379E−01 | −5.3452E−02 |
| A8 = | 3.1698E−02 | −5.6833E−02 | −2.8550E−01 | −2.4481E−01 | −4.0726E−02 | 5.7565E−02 |
| A10 = | −8.1256E−02 | −1.4515E−01 | 1.5864E−03 | 1.9155E−01 | −8.7690E−03 | −7.5913E−03 |
| A12 = | 6.9967E−02 | 2.0165E−01 | 1.6306E−01 | −8.6685E−02 | 1.6040E−01 | −8.9785E−02 |
| A14 = | −2.2060E−02 | −8.0374E−02 | −9.4883E−02 | 9.3997E−02 | −3.9718E−02 | 2.3693E−01 |

| Surface # | 8 | 9 | 10 | 11 | 12 | 13 |
|---|---|---|---|---|---|---|
| k = | −1.0000E+00 | 1.1629E+00 | −3.6484E+00 | −6.8036E+00 | 5.2999E+00 | −9.0000E+01 |
| A4 = | −2.0390E−01 | 1.0969E−01 | −7.1177E−02 | −1.4754E−01 | −4.3844E−02 | 8.2335E−02 |
| A6 = | −2.6803E−01 | −1.4880E−01 | −5.2949E−02 | 7.5384E−02 | 4.4463E−02 | −6.6513E−02 |
| A8 = | 2.1736E−01 | 1.2421E−01 | 2.1935E−02 | −1.2064E−03 | −9.2652E−03 | 2.0938E−02 |
| A10 = | −8.8536E−01 | −6.8616E−02 | −7.8718E−04 | −2.9452E−02 | −3.9089E−04 | −1.7204E−03 |
| A12 = | 5.7120E−01 | −2.0852E−02 | −8.2123E−02 | 1.5257E−02 | 1.9819E−04 | −4.8085E−04 |
| A14 = | 1.2069E−01 | 4.4717E−02 | 5.5724E−02 | −2.5558E−03 | −5.9321E−06 | 7.9250E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.37 | (R11 − R12)/(R11 + R12) | 0.17 |
| Fno | 2.70 | R12/|R11| | −0.71 |
| HFOV [deg.] | 24.1 | |R10 − R11|/f | 0.53 |
| Nmax | 1.639 | f/f4 | 0.37 |
| CT3/T34 | 1.24 | f/f5 | −1.28 |
| T23/T34 | 0.31 | SD/TD | 0.79 |
| T45/T34 | 0.68 | BL/TD | 0.14 |
| (R5 + R6)/(R5 − R6) | −1.38 | TL [mm] | 4.82 |
| (R7 − R8)/(R7 + R8) | 0.07 | | |

7th Embodiment

Figure 13:
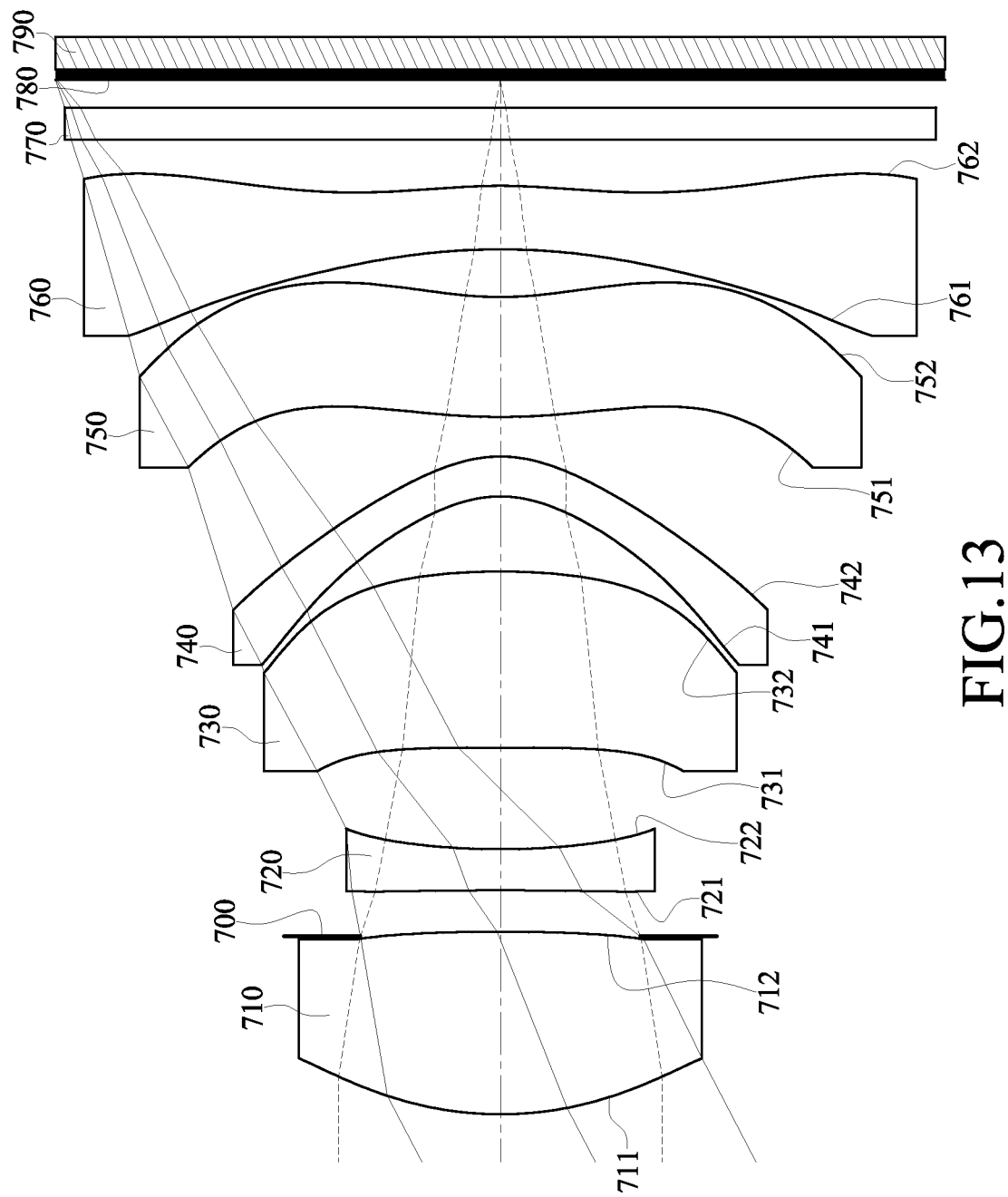
FIG. 13 is a schematic view of an image capturing unit according to the 7th embodiment of the present disclosure.
Figure 14:
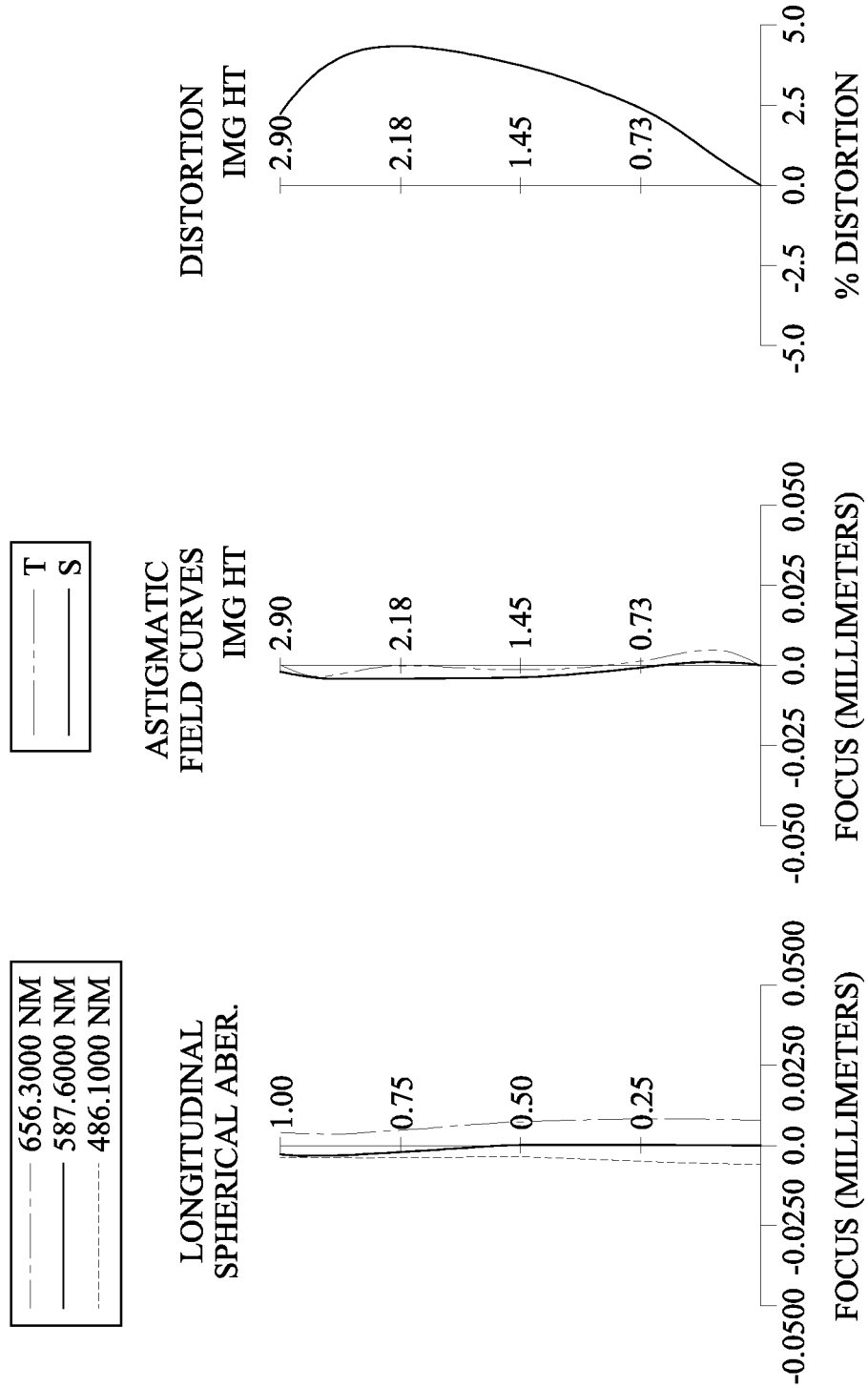
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 790. The photographing lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780, wherein the photographing lens assembly has a total of six lens elements (710-760) with refractive power. There is an air gap in a paraxial region between every two of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The image-side surface 762 of the sixth lens element 760 has at least one inflection point.

The IR-cut filter 770 is made of glass and located between the sixth lens element 760 and the image surface 780, and will not affect the focal length of the photographing lens assembly. The image sensor 790 is disposed on or near the image surface 780 of the photographing lens assembly.

The detailed optical data of the 7th embodiment are shown in Table 13 and the aspheric surface data are shown in Table 14 below.

TABLE 13

7th Embodiment
f = 5.43 mm, Fno = 2.60, HFOV = 27.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.262 | (ASP) | 1.191 | Plastic | 1.535 | 56.3 | 3.80 |
| 2 | | −16.107 | (ASP) | −0.031 | | | | |
| 3 | Ape. Stop | Plano | | 0.301 | | | | |
| 4 | Lens 2 | −63.442 | (ASP) | 0.269 | Plastic | 1.650 | 21.4 | −6.73 |
| 5 | | 4.703 | (ASP) | 0.663 | | | | |
| 6 | Lens 3 | −66.007 | (ASP) | 1.150 | Plastic | 1.535 | 56.3 | 8.72 |
| 7 | | −4.381 | (ASP) | 0.490 | | | | |
| 8 | Lens 4 | −0.804 | (ASP) | 0.260 | Plastic | 1.544 | 55.9 | 62.90 |
| 9 | | −0.875 | (ASP) | 0.258 | | | | |
| 10 | Lens 5 | 3.924 | (ASP) | 0.783 | Plastic | 1.650 | 21.4 | −8.29 |
| 11 | | 2.092 | (ASP) | 0.312 | | | | |
| 12 | Lens 6 | −4.307 | (ASP) | 0.415 | Plastic | 1.544 | 55.9 | 21.58 |
| 13 | | −3.258 | (ASP) | 0.300 | | | | |
| 14 | IR-cut filter | Plano | | 0.210 | Glass | 1.517 | 64.2 | — |
| 15 | | Plano | | 0.181 | | | | |
| 16 | Image | Plano | | — | | | | |

Note:
Reference wavelength is 587.6 nm (d-line).

TABLE 14

| Aspheric Coefficients | | | | | | |
|---|---|---|---|---|---|---|
| Surface # | 1 | 2 | 4 | 5 | 6 | 7 |
| k = | 2.7470E−02 | −1.0000E+00 | −5.0000E+01 | −1.9396E+01 | −1.0000E+00 | 5.6024E+00 |
| A4 = | −6.8108E−03 | −2.8828E−02 | −3.3169E−02 | 6.3344E−03 | −4.9689E−02 | −3.4335E−02 |
| A6 = | −3.9368E−03 | 3.9041E−03 | 5.4677E−02 | 4.3019E−02 | −1.0108E−02 | −8.7504E−03 |
| A8 = | 8.7470E−04 | −8.7414E−05 | −2.4714E−02 | −1.1790E−02 | 2.4009E−03 | −2.7721E−03 |
| A10 = | −2.8673E−03 | −4.3409E−03 | 9.9343E−03 | −3.0491E−03 | −4.4825E−03 | 9.8013E−04 |
| A12 = | 1.2838E−03 | 2.6285E−03 | −5.2551E−03 | 6.9705E−03 | −9.9832E−04 | −7.3293E−04 |
| A14 = | −3.1687E−04 | −3.0660E−04 | 3.1779E−03 | −8.2555E−04 | 9.9886E−04 | 4.1223E−04 |

| Surface # | 8 | 9 | 10 | 11 | 12 | 13 |
|---|---|---|---|---|---|---|
| k = | −2.2081E+00 | −2.5208E+00 | 1.9247E+00 | −2.5208E+01 | −1.4997E+00 | −9.0000E+01 |
| A4 = | 1.8335E−02 | 2.8191E−02 | −7.3774E−02 | −4.0467E−02 | 2.2475E−03 | 4.0939E−02 |
| A6 = | −5.5665E−02 | −3.1295E−02 | 1.0722E−02 | −1.1065E−03 | 3.3807E−03 | −9.9468E−03 |
| A8 = | 2.3173E−02 | 1.1784E−02 | −3.7324E−03 | 2.3545E−03 | −1.1233E−03 | 9.2307E−04 |

TABLE 14-continued

| Aspheric Coefficients | | | | | | |
|---|---|---|---|---|---|---|
| A10 = | −9.4115E−03 | −1.3298E−03 | 5.2242E−04 | −6.5147E−04 | 3.8984E−05 | 1.4718E−06 |
| A12 = | 3.1226E−03 | −3.0321E−04 | 1.8578E−05 | 7.5664E−05 | 1.8236E−05 | −7.4206E−06 |
| A14 = | −3.2523E−04 | 6.1252E−05 | −8.4158E−06 | −3.0847E−06 | −1.4701E−06 | 4.1419E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.43 | (R11 − R12)/(R11 + R12) | 0.14 |
| Fno | 2.60 | R12/|R11| | −0.76 |
| HFOV [deg.] | 27.5 | |R10 − R11|/f | 1.18 |
| Nmax | 1.650 | f/f4 | 0.09 |
| CT3/T34 | 2.35 | f/f5 | −0.66 |
| T23/T34 | 1.35 | SD/TD | 0.81 |
| T45/T34 | 0.53 | BL/TD | 0.11 |
| (R5 + R6)/(R5 − R6) | 1.14 | TL [mm] | 6.75 |
| (R7 − R8)/(R7 + R8) | −0.04 | | |

8th Embodiment

Figure 15:
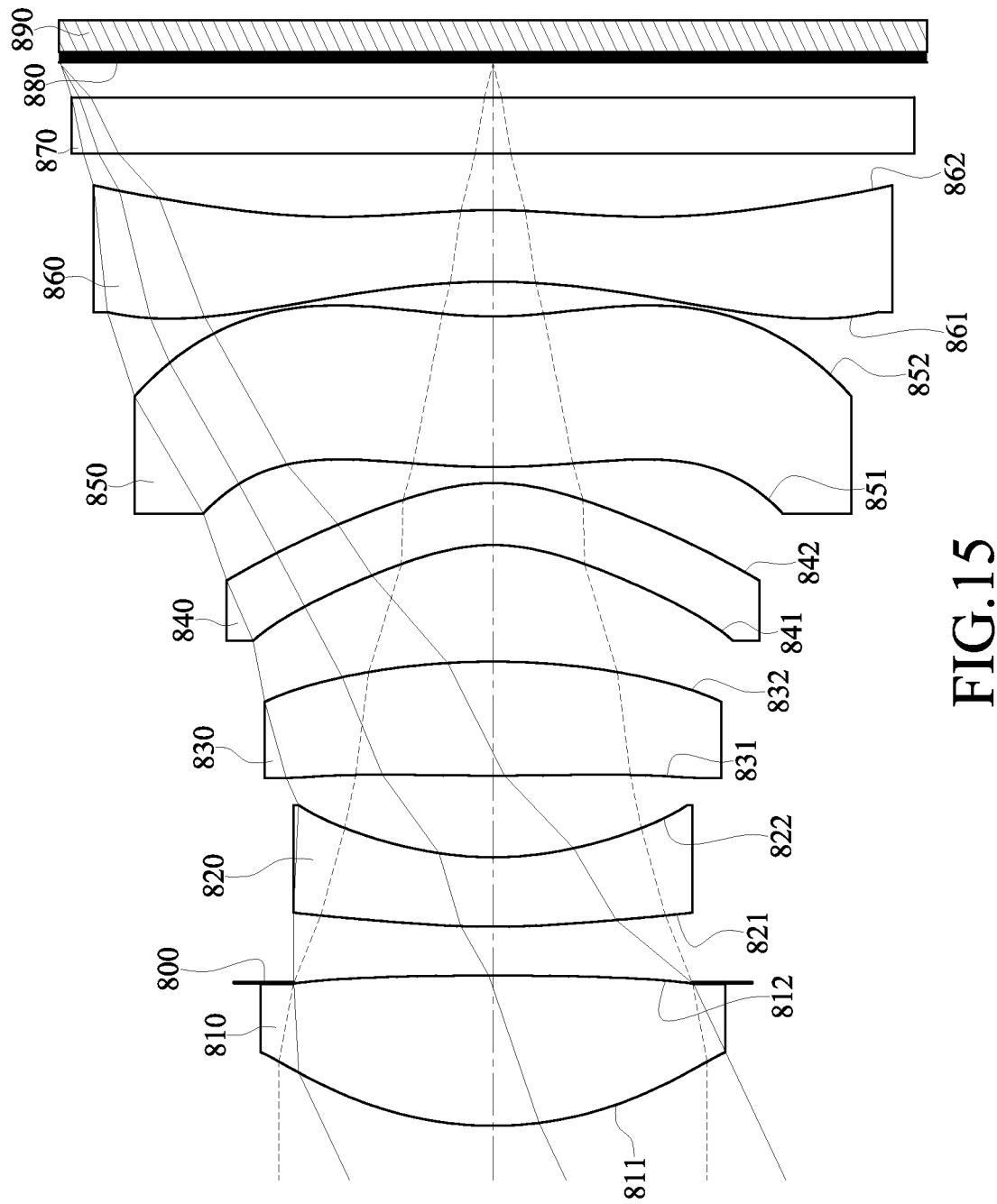
FIG. 15 is a schematic view of an image capturing unit according to the 8th embodiment of the present disclosure.
Figure 16:
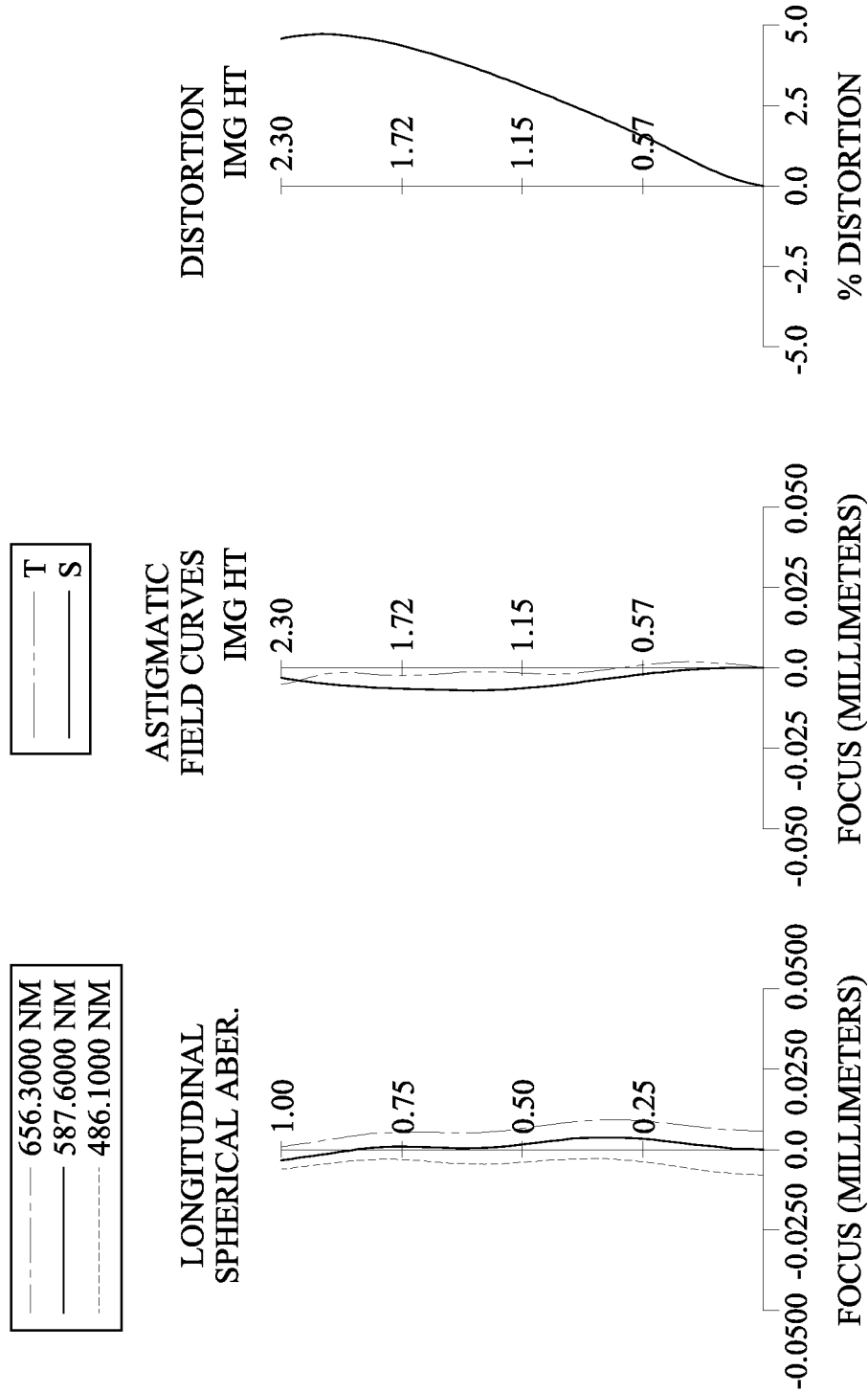
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 890. The photographing lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the photographing lens assembly has a total of six lens elements (810-860) with refractive power. There is an air gap in a paraxial region between every two of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point.

The IR-cut filter 870 is made of glass and located between the sixth lens element 860 and the image surface 880, and will not affect the focal length of the photographing lens assembly. The image sensor 890 is disposed on or near the image surface 880 of the photographing lens assembly.

The detailed optical data of the 8th embodiment are shown in Table 15 and the aspheric surface data are shown in Table 16 below.

TABLE 15

8th Embodiment
f = 4.66 mm, Fno = 2.05, HFOV = 25.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.949 | (ASP) | 0.799 | Plastic | 1.535 | 56.3 | 3.37 |
| 2 | | −20.772 | (ASP) | −0.039 | | | | |

TABLE 15-continued

8th Embodiment
f = 4.66 mm, Fno = 2.05, HFOV = 25.2 deg.

| Surface # | | Curvature Radius | | Thickness | Material | Index | Abbe # | Focal Length |
|---|---|---|---|---|---|---|---|---|
| 3 | Ape. Stop | Plano | | 0.298 | | | | |
| 4 | Lens 2 | 4.556 | (ASP) | 0.369 | Plastic | 1.639 | 23.5 | −4.90 |
| 5 | | 1.798 | (ASP) | 0.434 | | | | |
| 6 | Lens 3 | 18.553 | (ASP) | 0.606 | Plastic | 1.535 | 56.3 | 6.29 |
| 7 | | −4.059 | (ASP) | 0.620 | | | | |
| 8 | Lens 4 | −0.997 | (ASP) | 0.330 | Plastic | 1.650 | 21.4 | 48.67 |
| 9 | | −1.092 | (ASP) | 0.085 | | | | |
| 10 | Lens 5 | 3.960 | (ASP) | 0.800 | Plastic | 1.650 | 21.4 | −8.75 |
| 11 | | 2.148 | (ASP) | 0.185 | | | | |
| 12 | Lens 6 | −3.629 | (ASP) | 0.380 | Plastic | 1.544 | 55.9 | 58.52 |
| 13 | | −3.378 | (ASP) | 0.300 | | | | |
| 14 | IR-cut filter | Plano | | 0.300 | Glass | 1.517 | 64.2 | — |
| 15 | | Plano | | 0.185 | | | | |
| 16 | Image | Plano | | — | | | | |

Note:
Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | −3.0968E−02 | −1.0000E+00 | −3.0063E+01 | −5.2376E+00 | −1.0000E+00 | −6.9896E+00 |
| A4 = | −4.6350E−03 | −1.1412E−02 | −5.3353E−02 | −3.5596E−03 | −4.0653E−02 | −1.7857E−02 |
| A6 = | −1.0394E−03 | 1.2379E−02 | 6.8438E−02 | 4.9993E−02 | 2.8047E−04 | −4.3382E−03 |
| A8 = | −1.9233E−03 | −1.1489E−02 | −5.3124E−02 | −1.2824E−02 | 8.7258E−03 | 6.7166E−03 |
| A10 = | −4.4167E−03 | −6.1174E−03 | 2.3581E−02 | −1.9520E−02 | −1.1017E−04 | −3.7016E−03 |
| A12 = | 4.3445E−03 | 7.8028E−03 | −2.2589E−03 | 3.0118E−02 | −1.2327E−02 | −2.1810E−03 |
| A14 = | −2.1142E−03 | −2.8363E−03 | −9.3142E−04 | −7.6784E−03 | 9.2030E−03 | 1.1466E−03 |

| Surface # | 8 | 9 | 10 | 11 | 12 | 13 |
|---|---|---|---|---|---|---|
| k = | −3.9639E+00 | −4.3395E+00 | −1.0543E+01 | −3.4565E+01 | −2.1865E+01 | −9.0000E+01 |
| A4 = | 4.2721E−02 | 3.8342E−02 | −9.1584E−02 | −7.7817E−02 | −1.0305E−02 | 6.0636E−02 |
| A6 = | −4.6185E−02 | −3.7278E−02 | 1.8251E−02 | 8.1848E−03 | 7.5340E−03 | −1.9725E−02 |
| A8 = | 1.6987E−02 | 1.0144E−02 | −1.0416E−02 | 8.0418E−04 | −8.5049E−04 | 2.6329E−03 |
| A10 = | −7.9894E−03 | −9.4406E−04 | 9.0438E−03 | −4.7424E−04 | −2.3109E−06 | 1.4497E−06 |
| A12 = | 3.3719E−03 | 2.1342E−04 | 4.7510E−04 | 3.9577E−05 | 8.8908E−06 | −3.5986E−05 |
| A14 = | −1.2370E−03 | −5.1595E−05 | −7.9630E−05 | 5.8836E−07 | −4.7175E−07 | 2.9191E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.66 | (R11 − R12)/(R11 + R12) | 0.04 |
| Fno | 2.05 | R12/|R11| | −0.93 |
| HFOV [deg.] | 25.2 | |R10 − R11|/f | 1.24 |
| Nmax | 1.650 | f/f4 | 0.10 |
| CT3/T34 | 0.98 | f/f5 | −0.53 |
| T23/T34 | 0.70 | SD/TD | 0.84 |
| T45/T34 | 0.14 | BL/TD | 0.16 |
| (R5 + R6)/(R5 − R6) | 0.64 | TL [mm] | 5.65 |
| (R7 − R8)/(R7 + R8) | −0.05 | | |

9th Embodiment

Figure 17:
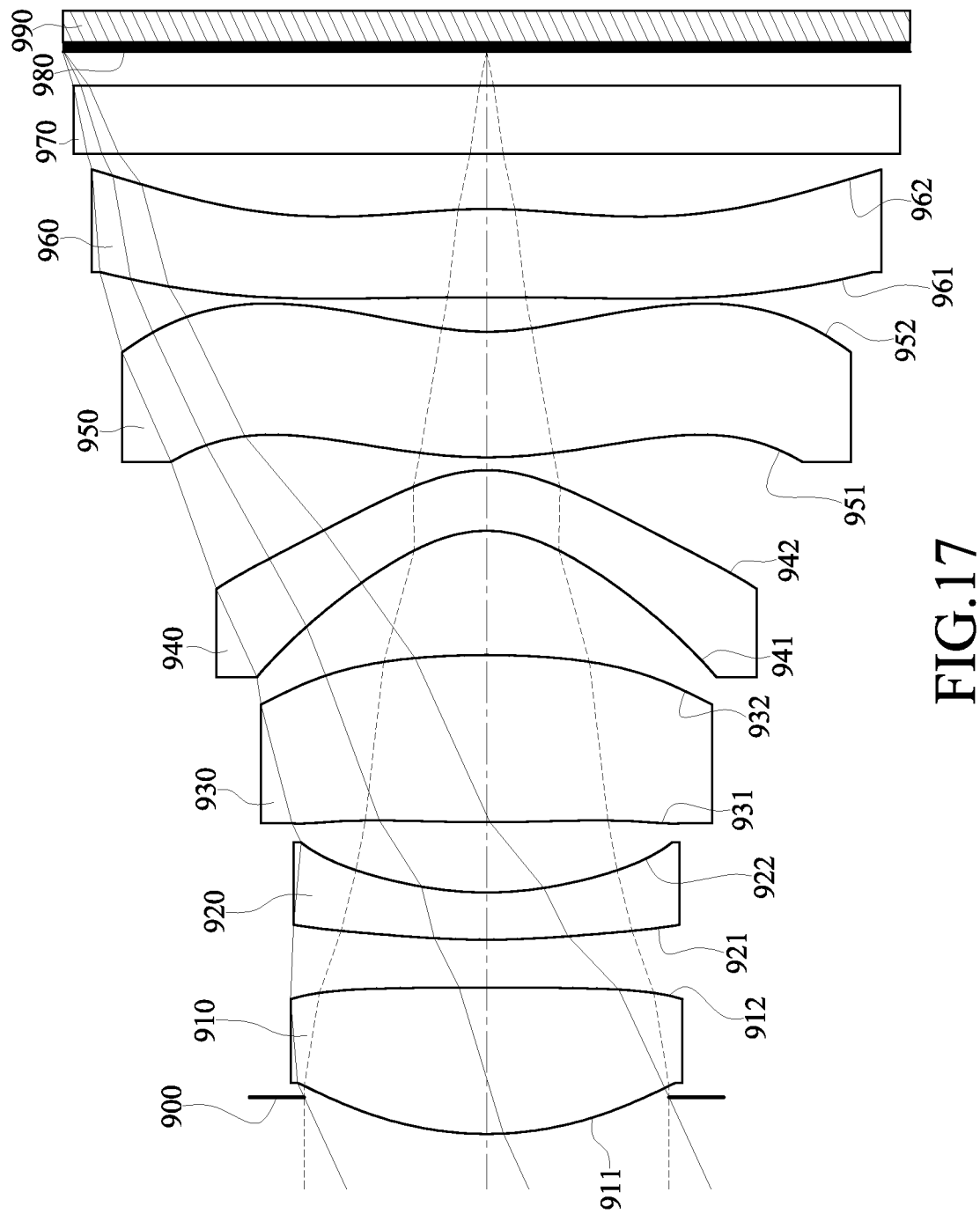
FIG. 17 is a schematic view of an image capturing unit according to the 9th embodiment of the present disclosure.
Figure 18:
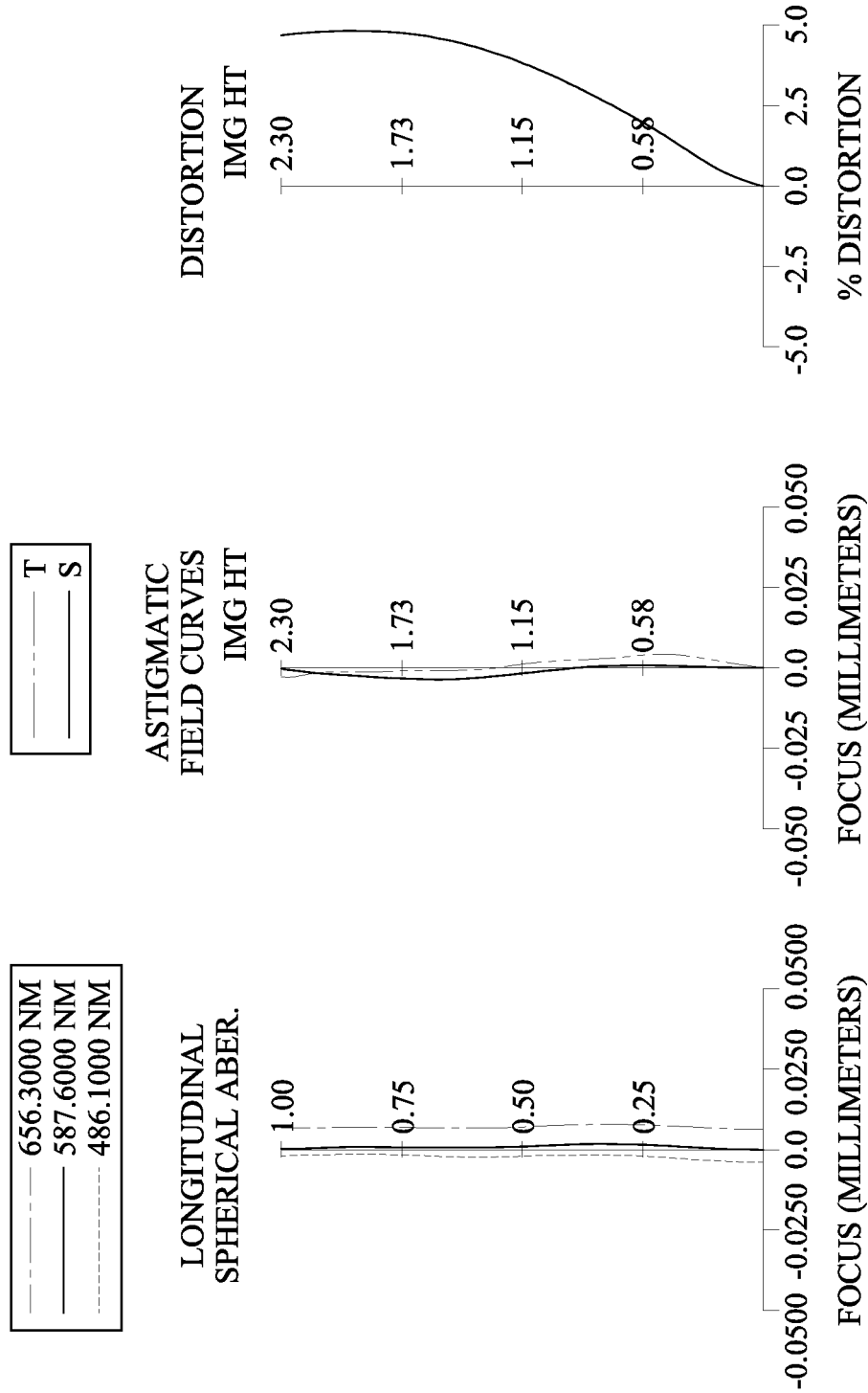
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 990. The photographing lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980, wherein the photographing lens assembly has a total of six lens elements (910-960) with refractive power. There is an air gap in a paraxial region between every two of the first lens element 910, the second lens element 920, the third lens element 930, the fourth lens element 940, the fifth lens element 950 and the sixth lens element 960 that are adjacent to each other.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has at least one inflection point. The image-side surface 952 of the fifth lens element 950 has at least one inflection point.

The sixth lens element 960 with positive refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point.

The IR-cut filter 970 is made of glass and located between the sixth lens element 960 and the image surface 980, and will not affect the focal length of the photographing lens assembly. The image sensor 990 is disposed on or near the image surface 980 of the photographing lens assembly.

The detailed optical data of the 8th embodiment are shown in Table 17 and the aspheric surface data are shown in Table 18 below.

TABLE 17

9th Embodiment
f = 4.76 mm, Fno = 2.40, HFOV = 24.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.200 | | | | |
| 2 | Lens 1 | 1.880 | (ASP) | 0.797 | Plastic | 1.535 | 55.7 | 3.44 |
| 3 | | −78.921 | (ASP) | 0.261 | | | | |
| 4 | Lens 2 | 4.467 | (ASP) | 0.257 | Plastic | 1.650 | 21.4 | −5.21 |
| 5 | | 1.883 | (ASP) | 0.383 | | | | |
| 6 | Lens 3 | 10.363 | (ASP) | 0.910 | Plastic | 1.535 | 56.3 | 6.46 |
| 7 | | −5.015 | (ASP) | 0.677 | | | | |
| 8 | Lens 4 | −0.654 | (ASP) | 0.330 | Plastic | 1.544 | 55.9 | 282.82 |
| 9 | | −0.767 | (ASP) | 0.070 | | | | |
| 10 | Lens 5 | 2.576 | (ASP) | 0.683 | Plastic | 1.650 | 21.4 | −5.49 |
| 11 | | 1.340 | (ASP) | 0.189 | | | | |
| 12 | Lens 6 | −23.341 | (ASP) | 0.480 | Plastic | 1.544 | 55.9 | 6.22 |
| 13 | | −2.975 | (ASP) | 0.300 | | | | |
| 14 | IR-cut filter | Plano | | 0.372 | Glass | 1.517 | 64.2 | — |
| 15 | | Plano | | 0.182 | | | | |
| 16 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | −1.2614E−01 | −1.0000E+00 | −4.4726E+01 | −7.2847E+00 | −1.0000E+00 | 1.0356E+01 |
| A4 = | −5.9892E−03 | −2.5474E−02 | −4.7831E−02 | 6.7467E−03 | −6.5162E−02 | −4.7689E−02 |
| A6 = | −5.5965E−03 | 1.1942E−03 | 7.0042E−02 | 5.8405E−02 | −2.9924E−03 | −3.5293E−03 |
| A8 = | −3.6381E−03 | −1.4582E−02 | −5.2863E−02 | −1.4313E−02 | 4.8676E−03 | 4.2016E−03 |
| A10 = | −4.5734E−03 | −5.5662E−03 | 2.5687E−02 | −1.4727E−02 | 1.4570E−03 | 2.3787E−04 |
| A12 = | 2.8097E−03 | 9.0434E−03 | −2.3412E−04 | 3.9184E−02 | −7.5007E−03 | 8.4033E−04 |
| A14 = | −2.5427E−03 | −3.6484E−03 | −2.2074E−03 | −9.5059E−03 | 1.3769E−02 | 5.6982E−04 |

| Surface # | 8 | 9 | 10 | 11 | 12 | 13 |
|---|---|---|---|---|---|---|
| k = | −2.2098E+00 | −2.9926E+00 | −7.1941E+00 | −1.6609E+01 | 3.8813E+01 | −7.0430E+01 |
| A4 = | 2.8435E−03 | 5.7673E−02 | −5.7769E−02 | −3.5540E−02 | 1.3175E−02 | 6.1675E−02 |
| A6 = | −4.3397E−02 | −3.1872E−02 | 1.7666E−02 | −1.9077E−03 | 2.6087E−03 | −1.6175E−02 |
| A8 = | 2.2611E−02 | 1.0196E−02 | −9.4790E−03 | 1.2637E−03 | −9.3044E−04 | 2.0429E−03 |

TABLE 18-continued

| Aspheric Coefficients | | | | | |
|---|---|---|---|---|---|
| A10 = | −6.9699E−03 | −1.7188E−03 | 1.1639E−03 | −3.6488E−04 | 2.4588E−05 | −2.2774E−05 |
| A12 = | 2.5062E−03 | −1.2574E−04 | 3.6082E−04 | 6.2574E−05 | 1.2678E−05 | −3.2308E−05 |
| A14 = | −1.1662E−03 | 8.9558E−06 | −7.4685E−05 | −4.1047E−06 | −6.8990E−07 | 3.2216E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.76 | (R11 − R12)/(R11 + R12) | 0.77 |
| Fno | 2.40 | R12/|R11| | −0.13 |
| HFOV [deg.] | 24.7 | |R10 − R11|/f | 5.18 |
| Nmax | 1.650 | f/f4 | 0.02 |
| CT3/T34 | 1.34 | f/f5 | −0.87 |
| T23/T34 | 0.57 | SD/TD | 0.96 |
| T45/T34 | 0.10 | BL/TD | 0.17 |
| (R5 + R6)/(R5 − R6) | 0.35 | TL [mm] | 5.89 |
| (R7 − R8)/(R7 + R8) | −0.08 | | |

The foregoing image capturing unit is able to be installed in, but not limited to, an electronic device, including smart phones, tablet personal computers and wearable devices. According to the present disclosure, the first lens element has positive refractive power so that it is favorable for keeping the photographing lens assembly in a compact size thereof. The second lens element has positive refractive power so that it is favorable for correcting the chromatic aberration of the photographing lens assembly. The sixth lens element has positive refractive power so that it is favorable for balancing the refractive power distribution of the photographing lens assembly. The sixth lens element has the object-side surface being concave in a paraxial region thereof and the image-side surface being convex in a paraxial region thereof so that it is favorable for correcting the aberration at the peripheral region of the image. When specific conditions are satisfied, the axial distances between the third lens element and adjacent lens elements are properly distributed so that it is favorable for improving the image quality and providing the photographing lens assembly with sufficient amount of space; thereby, it is favorable for assembling the photographing lens assembly so as to increase the manufacturing yield rate. Furthermore, it is favorable for reducing the total track length of the photographing lens assembly and providing sufficient relative illumination.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;

wherein the object-side surface of the third lens element is convex in a paraxial region thereof, the fifth lens element has negative refractive power, the image-side surface of the fifth lens element is concave in a paraxial region thereof, the sixth lens element has positive refractive power, and at least one of the object-side and the image-side surfaces of the six lens elements has at least one inflection point;

wherein a focal length of the first lens element and a focal length of the fourth lens element have different signs, an absolute value of a focal length of the sixth lens element is larger than an absolute value of the focal length of the first lens element, a central thickness of the sixth lens element is larger than an axial distance between the fifth lens element and the sixth lens element, and an absolute value of a curvature radius of the object-side surface of the sixth lens element is larger than an absolute value of a curvature radius of the object-side surface of the first lens element;

wherein an axial distance between the image-side surface of the sixth lens element and an image surface is BL, an axial distance between the object-side surface of the first lens element and the image-side surface of the sixth lens element is TD, a curvature radius of the image-side surface of the fifth lens element is R10, the curvature radius of the object-side surface of the sixth lens element is R11, a focal length of the photographing lens assembly is f, an axial distance between the second lens element and the third lens element is T23, an axial distance between the third lens element and the fourth lens element is T34, and the following conditions are satisfied:

$0.1 < BL/TD < 0.25;$ $0.25 < |R10 - R11|/f;$ and $0 < T23/T34 < 5.0.$

2. The photographing lens assembly of claim 1, wherein the object-side surface of the first lens element is convex in a paraxial region thereof, the second lens element has negative refractive power, and there is an air gap in a paraxial region between each of all adjacent lens elements of the photographing lens assembly.

3. The photographing lens assembly of claim 1, wherein the image-side surface of the fourth lens element is convex in a paraxial region thereof;
wherein an axial distance between the object-side surface of the first lens element and the image surface is TL, and the following condition is satisfied:

$TL<8.0$ mm.

4. The photographing lens assembly of claim 1, wherein a curvature radius of the image-side surface of the second lens element and a curvature radius of the image-side surface of the third lens element have a same sign;
wherein the axial distance between the second lens element and the third lens element is T23, the axial distance between the third lens element and the fourth lens element is T34, and the following condition is satisfied:

$0<T23/T34<2.5$.

5. The photographing lens assembly of claim 1, wherein the axial distance between the second lens element and the third lens element is T23, the axial distance between the third lens element and the fourth lens element is T34, and the following condition is satisfied:

$0<T23/T34<1.5$.

6. The photographing lens assembly of claim 1, wherein a curvature radius of the object-side surface of the third lens element is R5, a curvature radius of the image-side surface of the third lens element is R6, and the following condition is satisfied:

$-3.5<(R5+R6)/(R5-R6)<1.2$.

7. The photographing lens assembly of claim 1, wherein the absolute value of the focal length of the sixth lens element is larger than an absolute value of a focal length of the third lens element.

8. The photographing lens assembly of claim 1, wherein an absolute value of a curvature radius of the object-side surface of the third lens element is larger than the absolute value of the curvature radius of the object-side surface of the first lens element.

9. The photographing lens assembly of claim 1, wherein an absolute value of a curvature radius of the object-side surface of the fourth lens element is larger than the absolute value of the curvature radius of the object-side surface of the first lens element.

10. The photographing lens assembly of claim 1, wherein a curvature radius of the object-side surface of the second lens element and a curvature radius of the object-side surface of the fourth lens element have different signs.

11. The photographing lens assembly of claim 1, wherein the first lens element has positive refractive power.

12. An image capturing unit, comprising:
the photographing lens assembly of claim 1; and
an image sensor disposed on the image surface of the photographing lens assembly.

13. An electronic device, comprising:
the image capturing unit of claim 12.

14. A photographing lens assembly comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
wherein the fifth lens element has negative refractive power, the image-side surface of the fifth lens element is concave in a paraxial region thereof, the sixth lens element has positive refractive power, and at least one of the object-side and the image-side surfaces of the six lens elements has at least one inflection point;
wherein a focal length of the first lens element and a focal length of the fourth lens element have different signs, a curvature radius of the image-side surface of the second lens element and a curvature radius of the image-side surface of the third lens element have a same sign, and an absolute value of a curvature radius of the object-side surface of the fourth lens element is larger than an absolute value of a curvature radius of the object-side surface of the first lens element;
wherein an axial distance between the image-side surface of the sixth lens element and an image surface is BL, an axial distance between the object-side surface of the first lens element and the image-side surface of the sixth lens element is TD, a curvature radius of the object-side surface of the third lens element is R5, the curvature radius of the image-side surface of the third lens element is R6, a curvature radius of the image-side surface of the fifth lens element is R10, a curvature radius of the object-side surface of the sixth lens element is R11, a focal length of the photographing lens assembly is f, an axial distance between the second lens element and the third lens element is T23, an axial distance between the third lens element and the fourth lens element is T34, and the following conditions are satisfied:

$0.1<BL/TD<0.25$;

$0.25<|R10-R11|/f$;

$0<T23/T34<5.0$; and $-3.5<(R5+R6)/(R5-R6)<1.2$.

15. The photographing lens assembly of claim 14, wherein the object-side surface of the first lens element is convex in a paraxial region thereof, the object-side surface of the third lens element is convex in a paraxial region thereof, the image-side surface of the fourth lens element is convex in a paraxial region thereof, and there is an air gap in a paraxial region between each of all adjacent lens elements of the photographing lens assembly.

16. The photographing lens assembly of claim 14, wherein the second lens element has negative refractive power.

17. The photographing lens assembly of claim 14, wherein an absolute value of a focal length of the sixth lens element is larger than an absolute value of a focal length of the third lens element;
wherein the axial distance between the third lens element and the fourth lens element is T34, an axial distance between the fourth lens element and the fifth lens element is T45, and the following condition is satisfied:

$0<T45/T34<1.5$.

18. The photographing lens assembly of claim 14, wherein a central thickness of the sixth lens element is larger than a central thickness of the second lens element;
wherein an axial distance between the object-side surface of the first lens element and the image surface is TL, the axial distance between the second lens element and the third lens element is T23, the axial distance between the third lens element and the fourth lens element is T34, and the following conditions are satisfied:

$TL < 8.0$ mm; and $0 < T23/T34 < 1.5.$

19. The photographing lens assembly of claim 14, wherein a curvature radius of the object-side surface of the second lens element and the curvature radius of the object-side surface of the fourth lens element have different signs.

20. The photographing lens assembly of claim 14, further comprising an aperture stop, wherein the aperture stop is disposed on an object side of the third lens element.

21. The photographing lens assembly of claim 14, wherein the first lens element has positive refractive power.

* * * * *